United States Patent [19]

Jopson et al.

[11] Patent Number: 6,144,450

[45] Date of Patent: Nov. 7, 2000

[54] APPARATUS AND METHOD FOR IMPROVING THE ACCURACY OF POLARIZATION MODE DISPERSION MEASUREMENTS

[75] Inventors: Robert Meachem Jopson; Herwig Werner Kogelnik, both of Rumson; Lynn Elizabeth Nelson, Eatontown, all of N.J.

[73] Assignee: Lucent Technologies, Murray Hill, N.J.

[21] Appl. No.: 09/395,238

[22] Filed: Sep. 13, 1999

[51] Int. Cl.[7] .................................................... G01J 4/00
[52] U.S. Cl. ...................... 356/364; 250/225; 250/227.17
[58] Field of Search .............................. 250/225, 227.17; 356/364, 366, 73.1, 365

[56] References Cited

U.S. PATENT DOCUMENTS

| | | |
|---|---|---|
| 5,227,623 | 7/1993 | Heffner . |
| 5,491,576 | 2/1996 | Bergano .................................. 359/156 |
| 5,717,489 | 2/1998 | Ozeki et al. ............................ 356/364 |
| 5,822,100 | 10/1998 | Robinson et al. ...................... 359/161 |
| 6,016,379 | 1/2000 | Buelow ................................... 385/147 |
| 6,020,584 | 2/2000 | Brarens et al. ..................... 250/227.17 |

OTHER PUBLICATIONS

Heffner, B.L., "Deterministc, Analytically Complete Measurement of Polarization—Dependent transmission through Optical Devices," IEEE Photonics Technology Letters, May 1992, pp451–54, vol. 4, No. 5.

Heffner, B.L., " Automated Measurement of Polarization Mode Dispersion Using Jones Matrix Eigenanalysis," IEEE Photonics Technology Letters, Sep. 1992, pp. 1066–1069, vol. 4, No. 9.

Heffner, B.L., "Accurate, Automated Measurement of Differential Group Delay Dispersion and Principal State Variation using Jones Matrix Eigenanalysis," IEEE Photonics Technology Letters, Jul. 1993, pp 814–17, vol. 5, No. 7.

Poole, C.P. et.al., "Polarization Dispersion and Principal States in a 147–km Undersea Lightwave Cable" Journal of Lightwave Technology, Jul. 1988, pp. 1185–1190, vol. 6, No. 7.

Primary Examiner—Frank G. Font
Assistant Examiner—Layla Lauchman
Attorney, Agent, or Firm—Pryor Cashman Sherman & Flynn; Maxim H. Waldbaum

[57] ABSTRACT

An apparatus and method for simultaneously taking measurements that are used for determining PMD vectors. This reduces the time interval over which all measurements are taken and reduces inaccuracy caused by PMD variation during the time measurement interval. The apparatus and method may be used in conjunction with any technique for calculating PMD, such as the Poincaré Sphere Technique or Jones Matrix Eigenanalysis. The apparatus simultaneously produces multiple light beams. To distinguish each light beam from the others, each beam is given a distinct modulation. All the beams are then combined and passed through the optical device under test. A polarization measuring device then measures the output polarization of the combined beam and outputs one or more composite electrical signals that describe the Stokes components of the output polarization of the combined beam and that have the same modulations present in the original combined beam. Using modulation filters having the same modulations as given to each original light beam, electrical signals may be extracted from the composite electrical signals that describe the Stokes components of the output polarization corresponding to each original light beam. Also, measurement and control of the frequency difference between light beams used for determining PMD vectors is improved by receiving light beams of two distinct frequencies using a detector that then outputs a signal having a frequency equal to the difference in frequencies of the light beams. In addition, a feedback loop is used to better control the frequency difference between two light sources. Also, a frequency shifter is used to generate two light beams separated by a specific frequency interval.

54 Claims, 16 Drawing Sheets

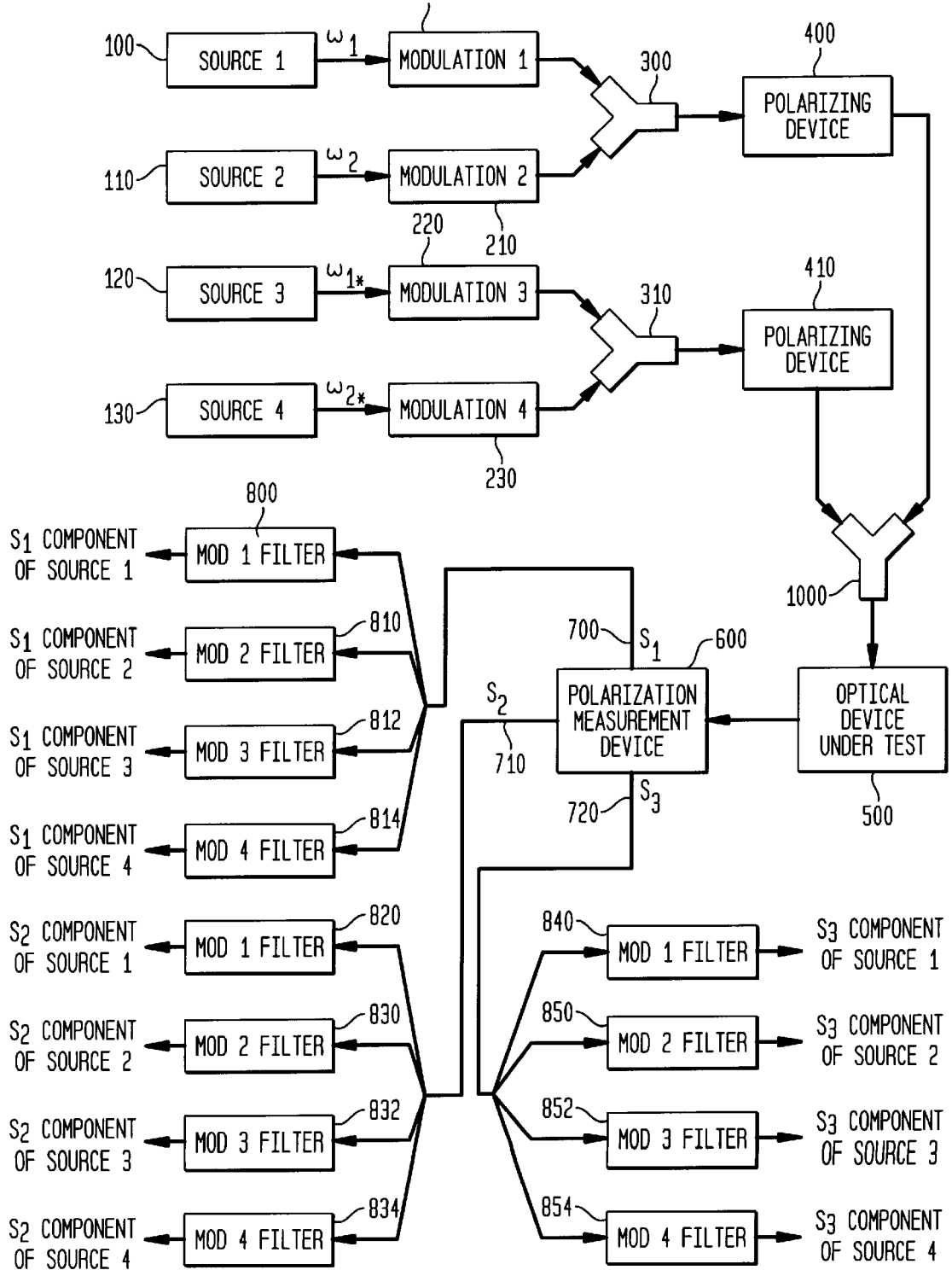

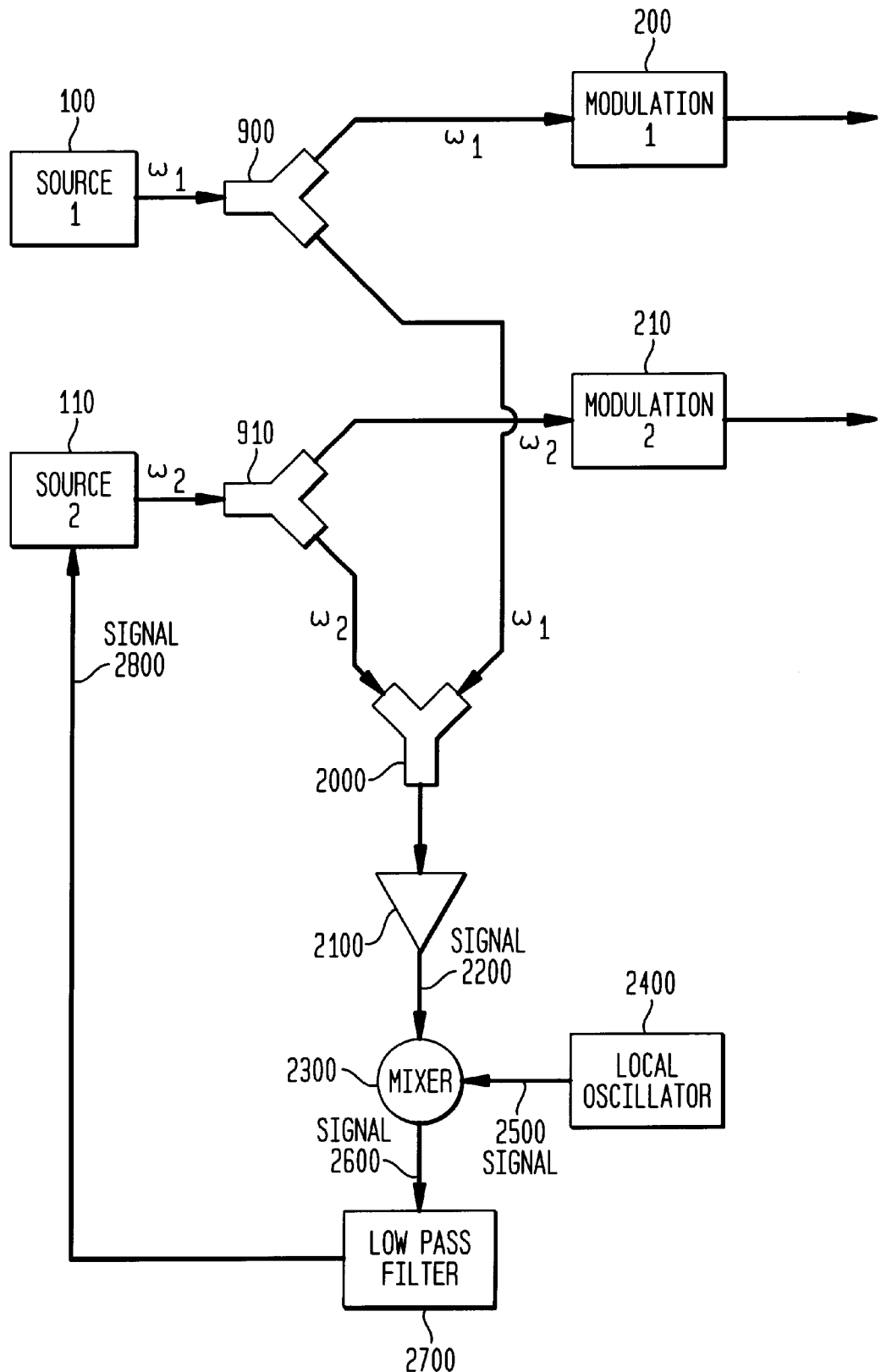

APPARATUS AND METHOD FOR IMPROVING THE ACCURACY OF POLARIZATION MODE DISPERSION MEASUREMENTS

FIELD OF THE INVENTION

The present invention relates generally to the field of fiber optic communications and specifically to the measurement of polarization mode dispersion in optical fibers.

BACKGROUND OF THE INVENTION

Optical telecommunications generally involves the use of light beams propagating through optical fibers to carry data. As the light beams travel through the fiber, they may be distorted by the fiber in a number of ways. One type of distortion caused by optical fiber is polarization mode dispersion, or "PMD".

PMD refers to an effect that an optical device, such as a span of optical fiber, has on the separate polarizations of a light beam. A light beam can be approximated as having electrical components that vibrate at right angles to the direction of travel. In the simple case of a short fiber section, the polarization or state of polarization of the light beam can be thought of as the direction of these right angle vibrations, where the light beam travels in a straight line. In the more general case, these components are superimposed in a more complex way.

The most convenient way to fully represent PMD and its effects is as a three dimensional vector. Generally the PMD vector is represented using Stokes space, a three-dimensional geometrical space, and the Poincare sphere, a sphere within Stokes space where every possible polarization state maps to a specific (and different) point on the sphere. Three axes, S1, S2, and S3, define this three dimensional space and any polarization can be described in reference to these axes. Thus, any polarization can be described by its S1, S2, and S3 components. The S1, S2, and S3 components of a polarization are called its Stokes components.

One effect of PMD is to cause the polarization of a light beam at the output of a fiber section, i.e., the output polarization, to vary with frequency when the polarization of the light beam at the input of the fiber section, i.e., the input polarization, remains fixed. In other words, because of PMD, a light beam having a given input polarization will have a first output polarization when the light beam is injected into the fiber at a first frequency $\omega_1$ and a second output polarization when the light beam is injected into the fiber at a second frequency $\omega_2$, where the second frequency $\omega_2$ differs from the first frequency $\omega_1$ by some frequency interval $\Delta\omega$, i.e., $\omega_2=\omega_1+\Delta\omega$.

In addition, PMD itself varies with frequency. Thus, referring to the previous example, the PMD calculated using the measurements taken at the frequency pair of $\omega_1$ and $\omega_2$ would be different from the PMD calculated using measurements taken at another frequency pair such as $\omega_2$ and $\omega_3$, where $\omega_3=\omega_2+\Delta\omega$, or $\omega_3$ and $\omega_4$, where $\omega_4=\omega_3+\Delta\omega$. Consequently, the PMD for a given optical device, such as a section of fiber, is measured over a frequency range.

An example of a current method for measuring PMD is the Poincaré Sphere Technique, or "PST". For each PMD determination, two different input polarizations are injected into an optical device under test, such as a fiber section, at each frequency of a frequency pair and the output polarizations are measured. Specifically, a light beam having a first input polarization is injected at the first frequency of the frequency pair into an optical device under test and the output polarization measured. Then, a light beam having this same first input polarization is injected at the second frequency of the frequency pair into the device under test and a second output polarization is measured. Third, a light beam having a second input polarization is injected at the same first frequency of the frequency pair into the device under test and a third output polarization is measured. Finally, a light beam having this same second input polarization is injected at the same second frequency of the frequency pair into the device under test and a fourth output polarization is measured. Depending on the results, a different first polarization may have to be chosen and the process repeated. The PMD for this first frequency pair is then calculated. This same procedure is used to determine the PMD for the other frequency pairs remaining in the frequency range being tested.

FIG. 1 shows a block diagram of a general apparatus capable of carrying out the previously described method. Control block 50, which could be a computer, directs tunable laser source 10 to sequentially emit light beams of various frequencies, such as the first and second frequencies described above. Control block 50 also directs polarizing device 20 to impart one of several polarizations to the beams emitted from 10, such as the first and second polarizations described above. Polarizing device 20 could consist of one or more linear or circular polarizers, with the number and type of polarizers depending upon the requirements of the specific PMD measurement method used. The light beams pass through the device being tested 30, such as a section of fiber, and are captured in polarization measuring device 40, which could be a polarimeter. Polarization measuring device 40 then measures the output polarization states of the light beams and passes this information to analysis block 60. Analysis block 60, which could be a computer, then calculates the PMD according to the algorithm used by the specific method.

This procedure for taking measurements and its corresponding apparatus have the deficiency that the measurements used to make each PMD determination are taken sequentially and are thus separated in time. Since PMD can change with changes in ambient temperature and external stresses on the fiber, the PMD of an optical device can change with time and thus will change during the time interval in which these measurements are taken. Consequently, the larger the time interval in which the measurements are taken, the larger the inaccuracy in PMD determinations made using the measurements.

SUMMARY OF THE INVENTION

The present invention consists of an apparatus and method for taking measurements which are used for determining PMD. It improves over the prior art by taking several measurements simultaneously. This reduces the time interval over which all measurements are taken and reduces inaccuracy caused by PMD variation during the time interval. The apparatus and method may be used in conjunction with many techniques for calculating PMD, such as the PST or the Jones Matrix Eigenanalysis method.

The apparatus of the present invention simultaneously produces multiple light beams. To distinguish each light beam from the others, each beam is given a distinct modulation. All the beams are then combined and passed through the optical device under test. A polarization measuring device then measures the output polarization of the combined beam and outputs one or more composite electrical signals which describe the Stokes components of the output polarization of the combined beam and which have the same modulations present in the original combined beam. Using modulation filters which pass through signals having the same modulations as given to each original light beam, electrical signals may be extracted from the composite electrical signals which describe the Stokes components of the output polarization corresponding to each original light beam.

Other aspects of the present invention include improvements for the measurement and control of the frequency difference between light beams used for determining PMD. The measurement improvement consists of receiving light beams of two distinct frequencies using a detector that then outputs a signal having a frequency equal to the difference in frequencies of the light beams. To better control the frequency difference between two light sources, a feedback loop is used or a frequency shifter is used to generate a light beam at a set frequency interval.

BRIEF DESCRIPTION OF THE DRAWINGS

FIG. 4 shows a block diagram of a third embodiment of the present invention.

FIG. 9a shows a block diagram of an alternative modification to the first embodiment which improves over frequency difference between light sources.

DETAILED DESCRIPTION OF THE INVENTION

Figure 1:
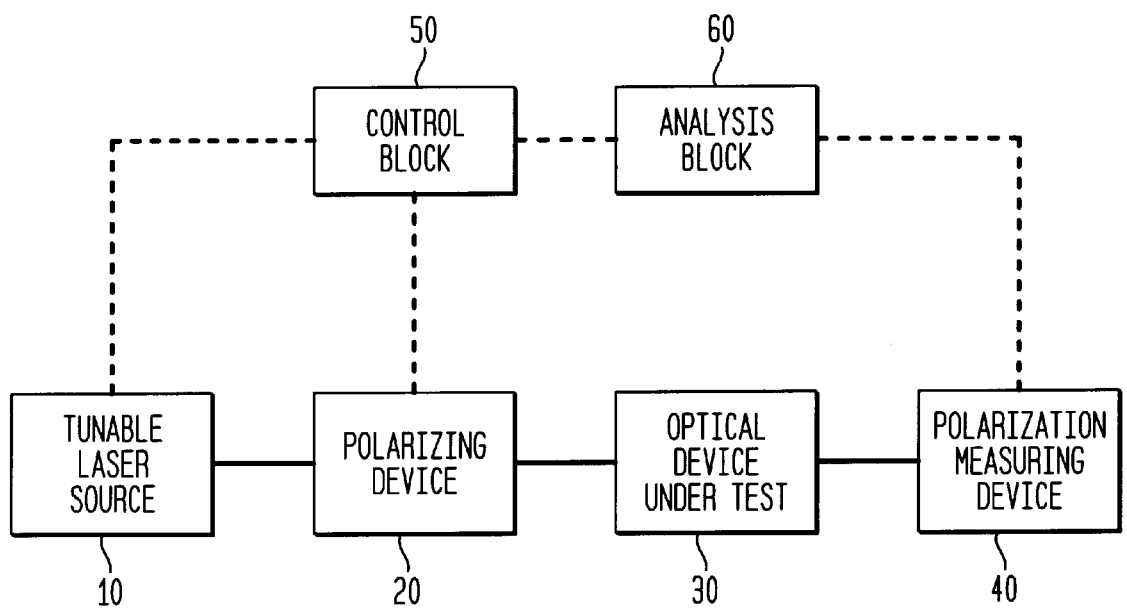
FIG. 1 shows a block diagram of a prior art apparatus for measuring PMD.
Figure 2:
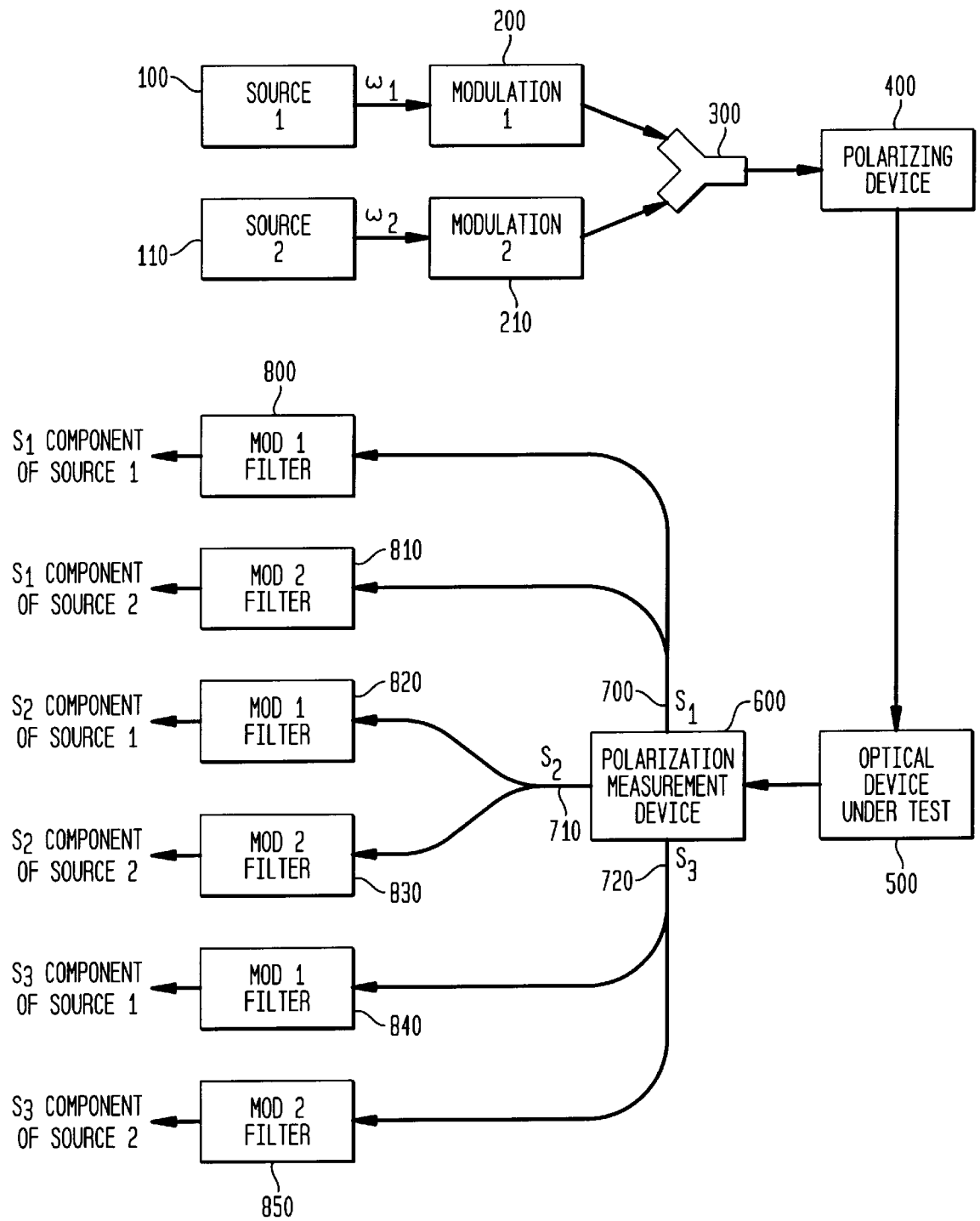
FIG. 2 shows a block diagram of a first embodiment of the present invention.

FIG. 2 shows a block diagram of a first embodiment of the invention. Two tunable light sources 100 and 110, which may be implemented as tunable wavelength lasers, simultaneously emit light beams at two frequencies of a frequency pair, $\omega_1$, and $\omega_2$. Specifically, source 100 emits a light beam at $\omega_1$ and source 110 emits a beam at $\omega_2$.

Each beam is then given a distinct modulation by modulation devices 200 and 210. The modulation has no purpose other than to distinctly mark each beam for later identification. As such, the particular modulation scheme employed is irrelevant. For example sinusoidal amplitude modulation could be used for each beam, with the first beam being amplitude modulated at 10 kHz, the second beam being amplitude modulated at 11 kHz, etc. Alternatively, code-division modulation could be used for each beam. An example of a modulation device compatible with the invention is the Lithium Niobate Mach-Zehnder amplitude modulator, which provides amplitude modulation.

The two modulated light beams are then combined at second stage combining device 300, which may be any means familiar to one of skill in the art used to combine optical signals such as a fused fiber coupler. In the various embodiments of the invention, a first stage combining device refers to a combining device that combines light beams prior to any modulation or polarization. A second stage combining device refers to a combining device that combines light beams after either modulation or polarization, but not both modulation and polarization. A third stage combining device refers to a combining device that combines light beams after both modulation and polarization.

The combined beam is then given a first input polarization by polarizing device 400. This polarizing device is capable of imparting one of several polarizations, the various polarizations being dependent on the requirements of the specific PMD calculation method used, and may include one or more linear or circular polarizers. The combined beam is thus a combination of two input light beams: a first beam having an optical frequency $\omega_1$, a first polarization, and a first modulation and a second beam having an optical frequency $\omega_2$, a first polarization, and a second modulation The combined beam is then injected into the optical device under test 500, which may be a section of optical fiber.

After the combined beam passes through the optical device 500, it is received at polarization measurement device 600, which may be a polarimeter. Polarization measurement device 600 converts the total light beam into three electrical signals 700, 710, and 720, which are proportional to the S1, S2, and S3 Stokes components, respectively, of the output polarization of the total light beam and each of which also generally has components having the same modulations as contained in the total light beam. Since the combined beam is a combination of the two input light beams, each of the three electrical signals is also a combination of electrical signals which are proportional to the S1, S2, or S3 Stokes components of the output polarizations of both input light beams. In other words, signal 700 is a composite electrical signal containing two component electrical signals each of which is proportional to the S1 Stokes component of the output polarization of one of the input beams; signal 710 is a composite electrical signal containing two component electrical signals each of which is proportional to the S2 Stokes component of the output polarization of one of the input beams; and signal 720 is a composite electrical signal containing two component electrical signals each of which is proportional to the S3 Stokes component of the output polarization of one of the input beams.

Each of the composite electrical signals is then passed through two modulation filters corresponding to the two modulations given to the light beams by modulation devices 200 and 210. Specifically signal 700 is passed through filters 800 and 810, signal 710 is passed through filters 820 and 830, and signal 720 is passed through filters 840 and 850.

The modulation filters extract the component electrical signals by passing through only those having a modulation that corresponds to the particular modulation filter. Specifically, modulation filter 800 passes through the component electrical signal that is proportional to the S1 Stokes component of the output polarization of the input light beam having a frequency $\omega_1$, and a first polarization. Filter 810 passes the component electrical signal that is proportional to the S1 Stokes component of the output polarization of the input light beam having a frequency $\omega_2$ and a first polarization. Filter 820 passes the component electrical signal that is proportional to the S2 Stokes component of the output polarization of the input light beam having a frequency $\omega_1$ and a first polarization. Filter 830 passes the component electrical signal that is proportional to the S2 Stokes component of the output polarization of the input light beam having a frequency $\omega_2$ and a first polarization. Filter 840 passes the component electrical signal that is proportional to the S3 Stokes component of the output polarization of the input light beam having a frequency $\omega_1$ and a first polarization. Filter 850 passes the component electrical signal that is proportional to the S3 Stokes component of the output polarization of the input light beam having a frequency $\omega_2$ and a first polarization.

The modulation filters may be implemented using any device capable of passing through only signals matching a particular modulation scheme. For instance, the filter may be an electric circuit such as an LC resonant tank circuit. In addition, multiple filters may be implemented using a single device. For instance, all the filters, 800 through 850, may be implemented using a digital signal processor (DSP). Thus, signals 700, 710, and 720 would be input into a single DSP which would perform the filtering functions of all filters 800 through 850. The DSP would then output the six signals shown coming out of filters 800 through 850.

Although the polarization measurement device is shown as a polarimeter outputting three electrical signals, it should be apparent to one of skill in the art that a polarimeter that outputs only two or even one electrical signal could be used. Where only two electrical signals are output representing Stokes components S1 and S2, filters 840 and 850 are unnecessary. Once two Stokes components of the output polarizations of both light beams are obtained, the remaining Stokes components can be calculated from the known components.

In the case of a polarimeter outputting a single electrical signal, whether the signal contains two Stokes components or all three S1, S2, and S3 components, these components may be marked, using for example different modulations. Thus there may be two sets of modulations, one set serving to uniquely identify the source frequencies corresponding to the beams originating from each of the light sources and another set serving to uniquely identify each of the Stokes components. In this situation, an additional layer of modulation filters may be employed to separate the signals of the different Stokes components. These separated signals could then be used with the modulation filters described previously.

Having obtained the S1, S2, and S3 Stokes components of the output polarizations of both light beams originally having a first input polarization, another set of measurements is then obtained for the same frequencies, but at a second input polarization. Thus, the process described above is repeated with polarizing device 400 now giving the combined beam a second input polarization. Once data is obtained corresponding to both input polarizations, a PMD vector to first order can be determined using any one of several PMD calculation methods. For some PMD calculation methods, the process described above must be repeated for a third input polarization state and then a PMD vector to first order can be determined.

Thus, where the prior art sequentially takes four single measurements, i.e., two polarizations each at two frequencies sequentially, the apparatus and method of the embodiment just described takes two multiple measurements, i.e., two polarizations each at two frequencies simultaneously. Since each of these measurements can be accomplished in essentially the same time as one of the four single measurements of the prior art, the apparatus and method of this embodiment operates in half the time as compared with the prior art. Thus, PMD measurements obtained from this embodiment are more accurate because the time interval over which the measurements are taken is smaller. Faster PMD measurement also allows for faster tracking of PMD over a range of frequencies.

Figure 2A:
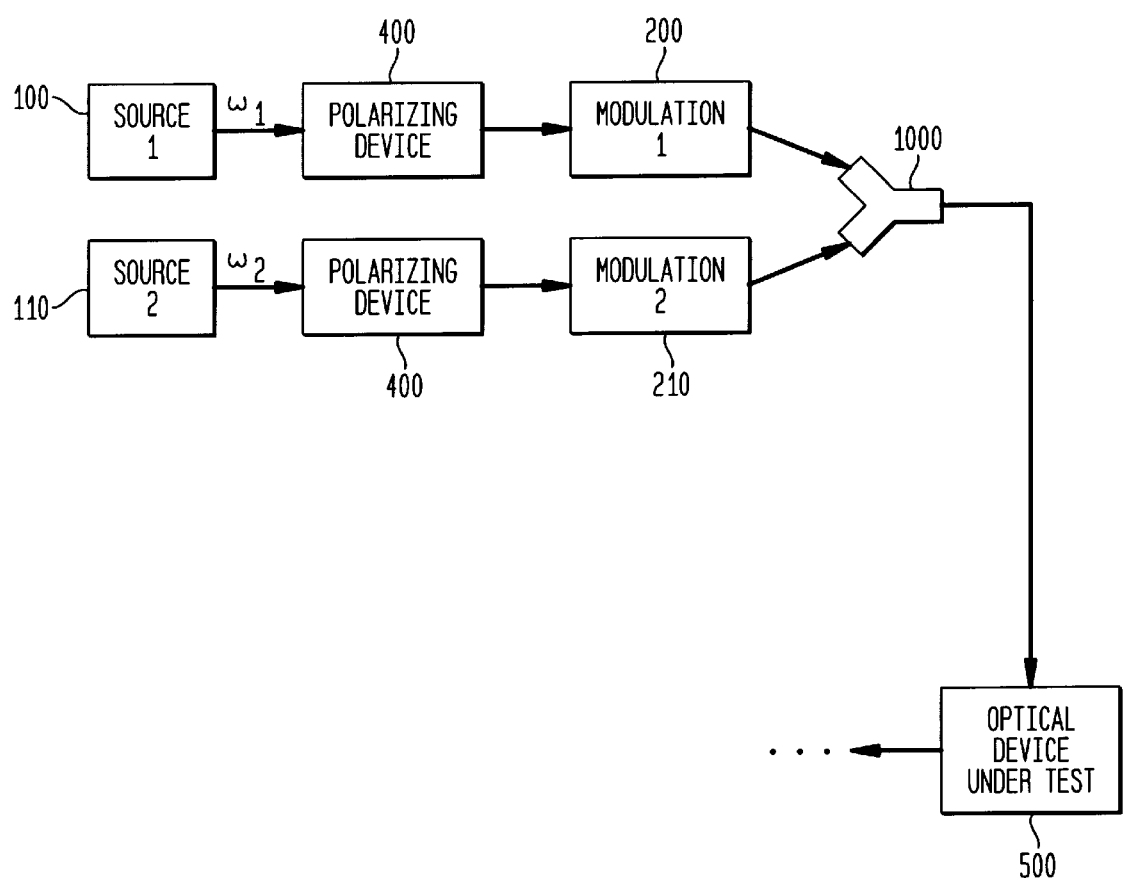
FIG. 2a shows a block diagram of a modified first embodiment of the present invention.

Although the modulating devices 200 and 210 are shown preceding the polarizing device in the path of the light beams, it should be apparent to one of skill in the art that the order of the modulating devices and polarizing devices is not a limiting factor in this embodiment or the succeeding embodiments. For instance, FIG. 2a shows how the apparatus of FIG. 2 could be altered so that the polarizing devices occur in the path of the light beams prior to the modulating devices. Specifically, two polarizing devices 400, each providing the same polarization, could be placed following the sources. The polarized beams would then be modulated by modulation devices 200 and 210 before being combined in third stage combining device 1000 and input to the optical device under test. Other embodiments of the invention may be similarly altered so that the polarizing devices occur prior to the modulation devices if so desired.

Figure 2B:
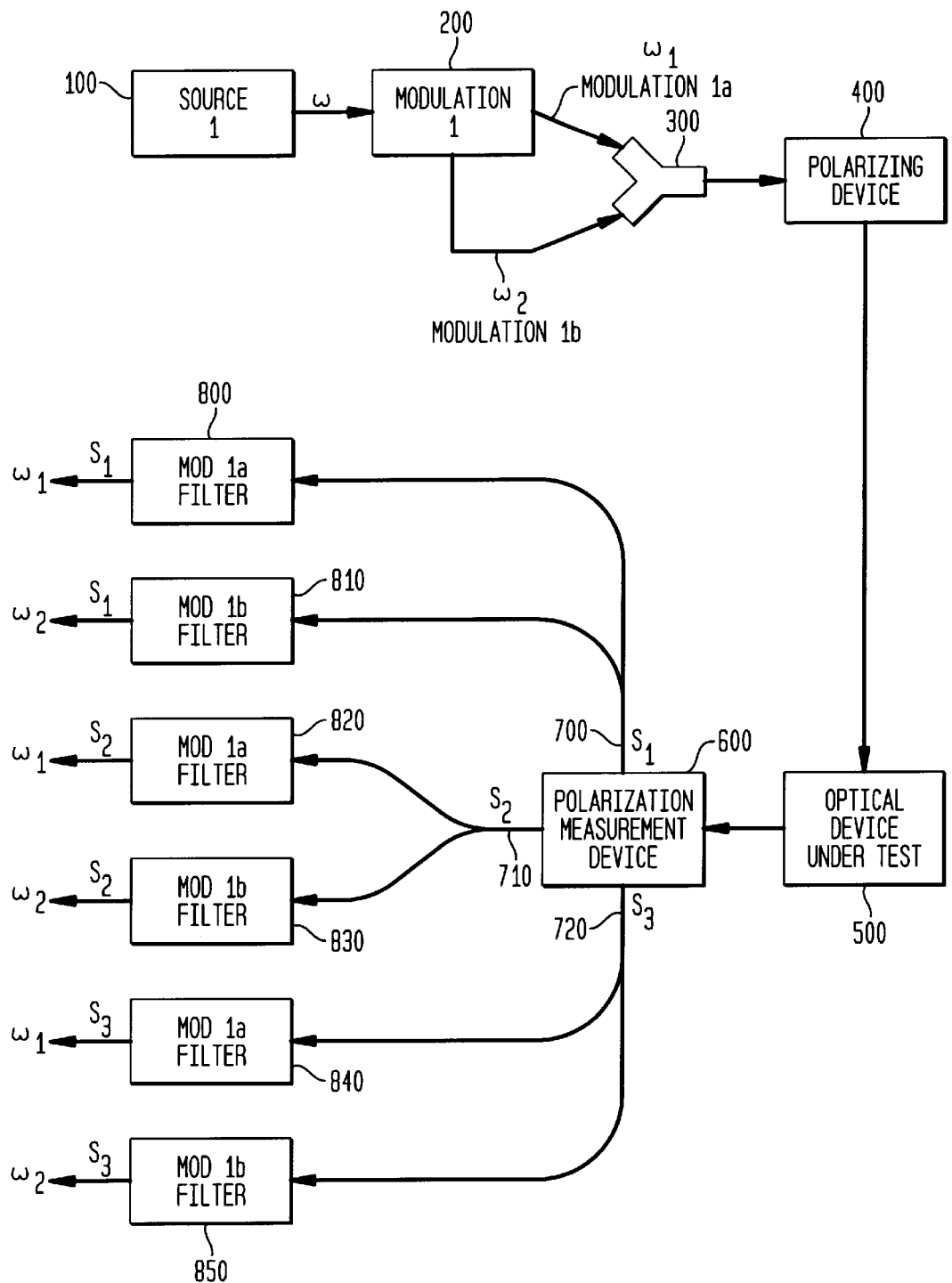
FIG. 2b shows a block diagram of another modification to the first embodiment of the present invention.

Also, although the embodiment shown in FIG. 2 assumes that each modulation device outputs a single modulated light beam, it should be apparent to one of skill in the art that this embodiment and the succeeding may be modified to accommodate modulation devices which output more than one modulated light beam from a single input light beam. FIG. 2b shows the apparatus of FIG. 2 modified to use a modulation device which outputs two light beams. From a single input light beam having a frequency $\omega$, modulation device 200 outputs two light beams having distinct frequencies and distinct modulations, the first having a frequency $\omega_1$ and a modulation 1a and the second having a frequency $\omega_2$ and having a modulation 1b. Frequency $\omega_1$ equals frequency $\omega$ minus an interval $\Delta\omega$ while frequency $\omega_2$ equals frequency $\omega$ plus an interval $\Delta\omega$. The rest of the apparatus shown in FIG. 2b is similar to that of FIG. 2.

In addition, although FIG. 2 shows all the combined beams coming out of the optical device under test being input to a single polarization measurement device, it should be apparent to one of skill in the art that the beams exiting from the optical device under test may be separated into two or more groups, for example using frequency selective optical filters, and each group input into a separate polarization measurement device if desired.

In the first embodiment, the time interval over which all measurements for a single PMD determination is reduced compared to the prior art by taking measurements for each input polarization simultaneously for both frequencies of a frequency pair. Alternatively, this time interval can be similarly reduced by taking measurements for each frequency simultaneously for both input polarizations.

Figure 3:
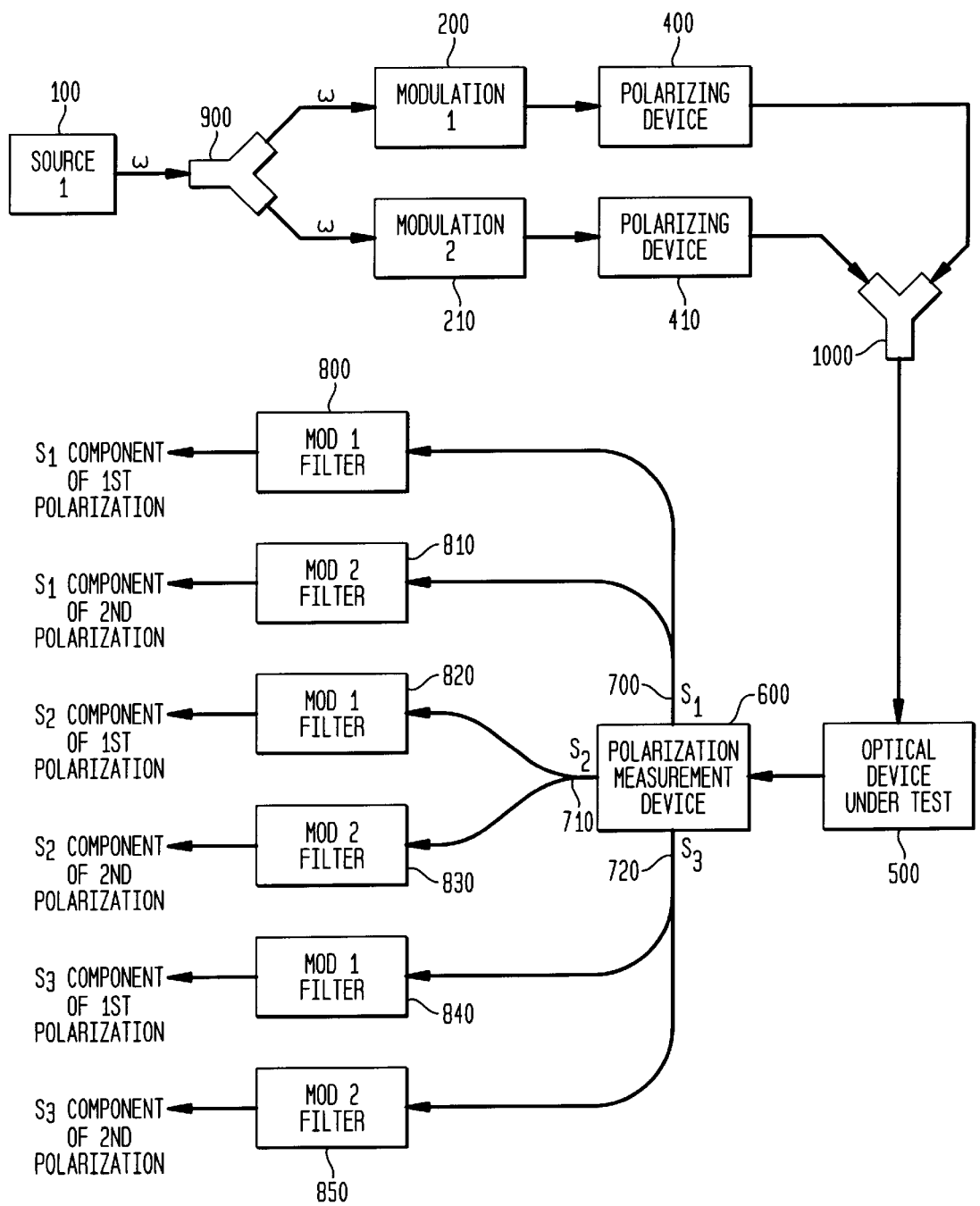
FIG. 3 shows a block diagram illustrating the idea of taking measurements for multiple input polarizations simultaneously at a single frequency.

FIG. 3 shows a block diagram of an apparatus which illustrates the general idea of simultaneously taking measurements for two input polarizations at a single frequency. The figure shows a single light source, but multiple polarizing devices with each polarizing device imparting a distinct polarization. Source 100 produces a light beam of frequency ω which is input to a splitting device 900, which may be implemented using a fused fiber coupler. Splitting device 900 splits the light beam into two light beams both having the same frequency. Each beam is given a distinct modulation by modulation devices 200 and 210. Instead of combining the light beams immediately after they are modulated, the light beams here are combined by third stage combining device 1000, which may be a fused fiber coupler, after the light beams have been given distinct polarizations by polarizing devices 400 and 410.

Although the general idea of simultaneously taking measurements for two input polarizations at a single frequency is well illustrated by FIG. 3, the actual implementation of this concept is slightly more complicated. Ideally, each composite electrical signal 700, 710, and 720 output from the polarization measurement device should contain component electrical signals each of which describes the output polarization of only one input beam. However, when light beams of identical frequencies are input to a polarization measurement device that contains detectors which measure the power of the light beams entering them, as may be the case in the apparatus of FIG. 3, some modulation schemes, such as amplitude modulation, may cause each component electrical signal output from the polarization measurement device to contain information describing the output polarization of more than one input beam.

A specific example of this problem can be illustrated as follows. Suppose modulation device 200 provides amplitude modulation at a frequency $\omega_1$ and modulation device 210 provides amplitude modulation at a frequency $\omega_2$. If polarization measurement device 600 contains one or more detectors, such as photo diodes, which measure the power of the light beams entering them, then each component electrical signal will describe the output polarization of both light beams. In other words, composite electrical signal 700 will contain two component electrical signals—one component electrical signal amplitude modulated at co, which mainly describes the S1 Stokes component of the output polarization of the light beam output from modulation device 200, but which also contains information about the S1 Stokes component of the output polarization of the light beam output from modulation device 210 as well, and another component electrical signal amplitude modulated at $\omega_2$ which mainly describes the S1 Stokes component of the output polarization of the light beam output from modulation device 210, but which also contains information about the S1 Stokes component of the output polarization of the light beam output from modulation device 200.

Figure 3A:
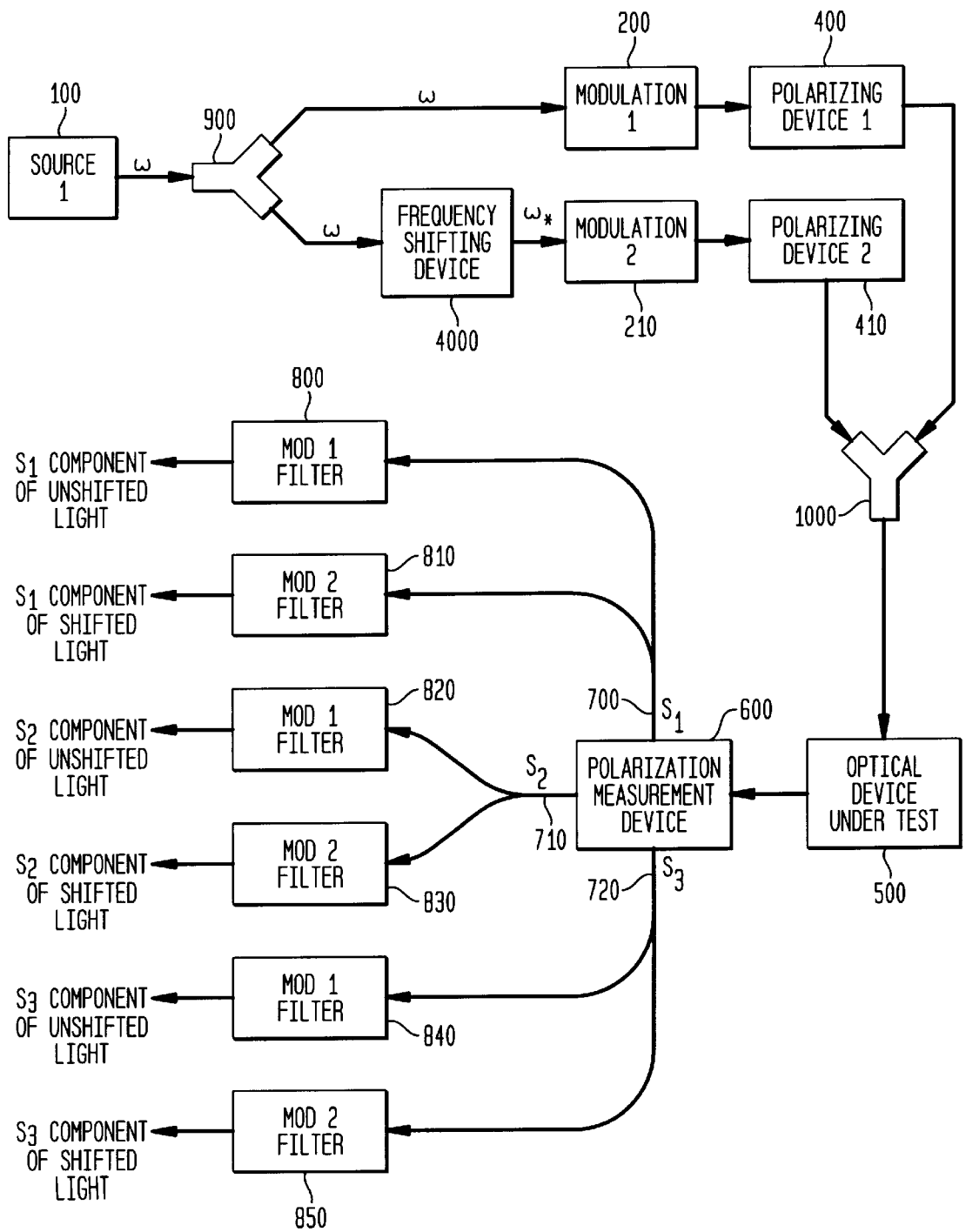
FIG. 3a shows a block diagram of a second embodiment of the present invention.

This mixing of information between the component signals can be avoided by adding a small frequency shift to one of the light beams. FIG. 3a shows a block diagram of a second embodiment of the invention employing this frequency shifting. The apparatus of FIG. 3a is similar to the apparatus shown in FIG. 3 with the addition of frequency shifting device 4000 between splitting device 900 and modulation device 210. Frequency shifting device 4000 can be any device capable of adding a specific frequency interval to an input light beam. For instance, frequency shifting device 4000 may be implemented as a bulk-optic acousto-optic modulator which is also called a Bragg cell. The light beam output from frequency shifting device 4000 has a frequency $\omega^*$, which is equal to the frequency ω plus a very small frequency interval $\Delta\omega$.

Since the PMD calculations using the signals coming out of the modulation filters 800 to 850 generally assume that both input light beams have the same frequency, adding a frequency shift to one of the beams introduces some error. However, if $\Delta\omega$ is chosen to be much less than the frequency difference between the frequencies of the frequency pair ($\omega_1$ and $\omega_2$) used for the PMD determination, e.g., $\Delta\omega<100(\omega_2-\omega_1)$, then this error is very small and is well within tolerable limits. On the other hand, $\Delta\omega$ must still be large enough so as to provide an undetectable frequency difference between the two light beams for polarization measurement time of polarization measurement device 600, i.e., its 3 dB roll-off point. For example, $\Delta\omega$ may be chosen such that $\Delta\omega>100\times$ reciprocal of the response time of polarization measurement device 600.

Although frequency shifting device 4000 is placed between splitting device 900 and modulation device 210, it should be apparent to one of skill in the art that frequency shifting device 4000 may be placed at any point along the path of one of the light beams after the splitting device and prior to the beams being combined by combining device 1000.

Once measurements are taken for both polarizations at one frequency of a frequency pair, i.e., $\omega_1$, then the procedure is repeated for the second frequency of the pair, i.e., $\omega_2$. As with the first embodiment, the second embodiment takes all measurements required to determine a first order PMD vector for a pair of frequencies in half the time required by the prior art.

It should be apparent to one skilled in the art that the beams leaving polarizing devices 400 and 410 may have their polarizations altered by the path connecting the polarizing devices with the combining device 1000, for example if this connecting path consists of optical fiber. For example, suppose it is desired that the input polarizations of the light beams be orthogonal to each other upon entering optical device under test 500. Thus, polarizing devices 400 and 410 might naively be controlled to provide polarizations that are orthogonal relative to each other. However, as the beams propagate through the optical fiber connecting the polarizing devices to the point where the beams are combined in the combining device, the polarizations of the light beams change such that they might, for instance, be identical upon the light beams entering the optical device under test.

Consequently, the polarizations of polarizing devices 400 and 410 should be chosen so as to take into account the rotation caused by any connecting fiber. Thus, in the above example, it might be necessary for the polarizations of the polarizing devices to be identical. The connecting fiber would then rotate the polarizations of the beams such that the polarizations will be orthogonal relative to each other by the time the beams are combined in the combining device.

FIG. 4 shows a block diagram of a third embodiment of the invention in which all the measurements needed to determine a first order PMD vector for a pair of frequencies are taken at one time. This embodiment operates similarly to the first and second embodiments in all respects except that additional devices are used to take all the required simultaneous measurements. Thus, this third embodiment uses four tunable light sources 100, 110, 120, and 130 which simultaneously emit four light beams at two frequencies of a frequency pair, $\omega_1$ and $\omega_2$. Specifically, source 100 emits a light beam at $\omega_1$ and source 110 emits a beam at $\omega_2$. Sources 120 and 130 ideally should emit beams having frequencies identical to the frequencies of the beams from sources 100 and 110. However, due to the possible difficulties of inputting beams of identical frequency into polarization measurement device 600, as described previously with regard to FIG. 3, sources 120 and 130 emit light beams having frequencies slightly shifted from the frequencies of the beams emitted from sources 100 and 110. Specifically, source 120 emits a light beam having a frequency $\omega_1^*$, which is equal to $\omega_1$ plus a small frequency interval $\Delta\omega$. Likewise, source 130 emits a light beam having a frequency $\omega_2$, which is equal to $\omega_2$ plus a small frequency interval $\Delta\omega$. The small frequency interval $\Delta\omega$ is chosen using the same guidelines as described with reference to the discussion of FIGS. 3 and 3a.

Thus, in the apparatus of FIG. 4, there are two pairs of light beams where each pair of beams has one beam at frequency $\omega_1$, or substantially at $\omega_1$, and one beam at frequency $\omega_2$, or substantially at $\omega_2$. Four modulation devices 200, 210, 220, and 230 give each input light beam a distinct modulation.

Each pair of modulated beams is then combined in second stage combining devices 300 and 310 and given a distinct polarization so that the combined beam from sources 100 and 110 is given a first polarization by polarizing device 400 and the combined beam from sources 120 and 130 is given a second polarization by polarizing device 410. The combined beams leaving each polarizing device are then combined by third stage combining device 1000 into one total light beam which is then injected into the optical device under test 500.

The process of measuring the output polarization of the total beam and separating the electrical signals from the polarization measurement device 600 operates as previously described except that four modulation filters, corresponding to the four modulations imparted by modulation devices 200, 210, 220, and 230, are now required for each electrical signal output from the polarization measurement device. Thus, if three electrical signals representing Stokes components S1, S2, and S3 are output, three sets of four modulation filters are required.

Since all four measurements are taken at one time, this embodiment operates in approximately one fourth the time required by the prior art.

Figure 5:
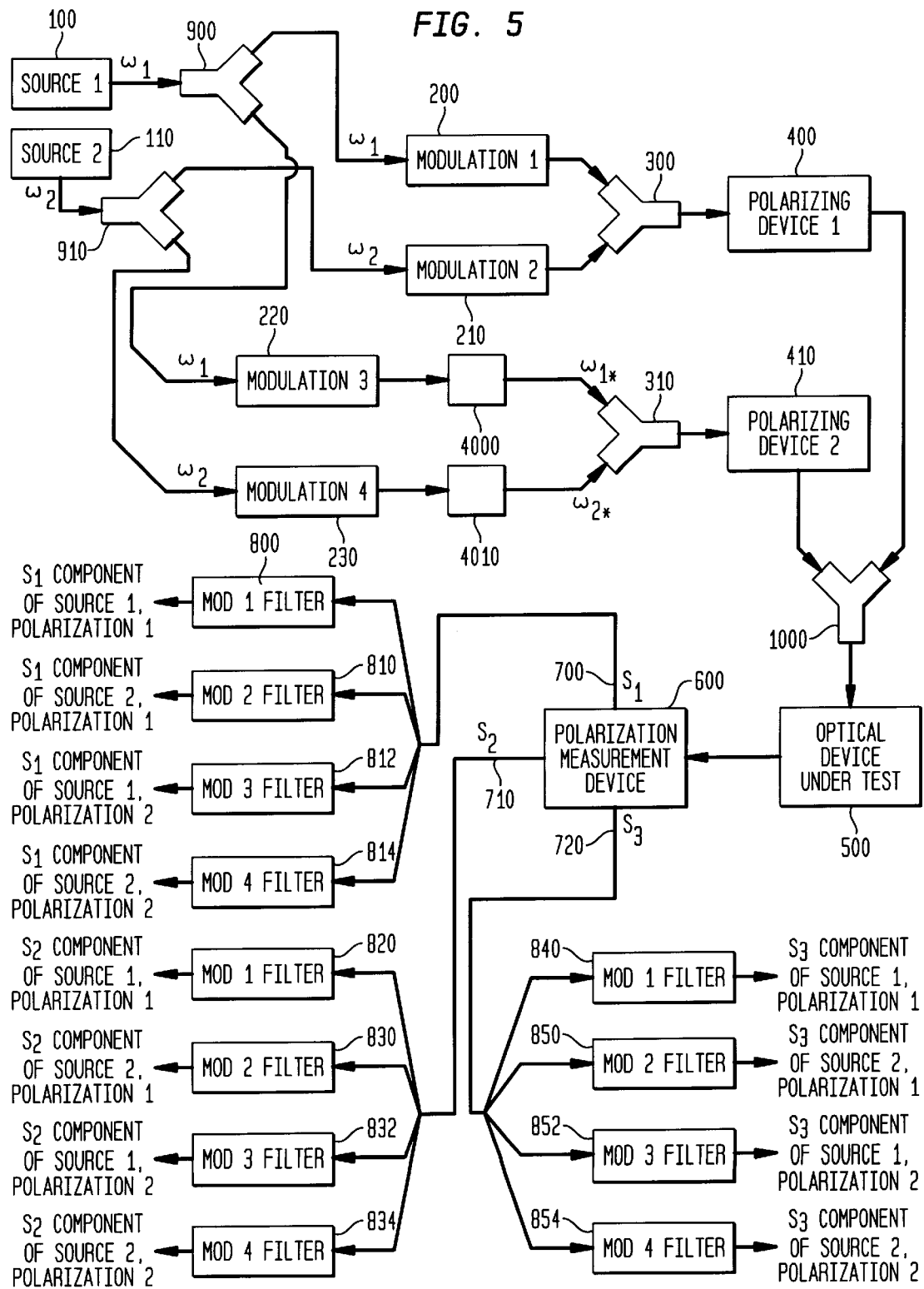
FIG. 5 shows a block diagram of portion of the third embodiment modified to use only two light sour

FIG. 5 shows how the third embodiment may be modified so that only two sources are required, i.e., by splitting the beams emitted by each source using splitting devices 900 and 910. Frequency shifting devices 4000 and 4010 add a small frequency interval $\Delta\omega$ to two of the beams so as to give the two beams frequencies of $\omega_1^*$ and $\omega_2^*$. As described previously in connection with FIG. 3, this addition of a small frequency interval might be necessary when multiple light beams having identical frequencies are input to a polarizing measurement device which contains detectors that measure the power of the light beams entering them.

Also, some frequency shifting devices, such as bulk optic acousto-optic modulators, can shift the frequencies of multiple light beams simultaneously. Thus, the frequency shifting function of devices 4000 and 4010 could in some instances be performed by a single frequency shifting device, such as a bulk optic acousto-optic modulator, placed after second stage combining device 310 and before third stage combining device 1000. Whether one or more than one frequency shifter is used, the small frequency interval $\Delta\omega$ added is chosen using the same guidelines as described previously in connection with FIG. 3.

The invention may also be used to take enough measurements to enable a calculation of higher order PMD. For example, second order PMD vectors may be calculated from the results of two first order PMD vector calculations. In other words, if we determine first order PMD vectors for two frequency intervals, these two first order PMD vector results can then be used to calculate a second order PMD vector over these intervals.

Figure 6:
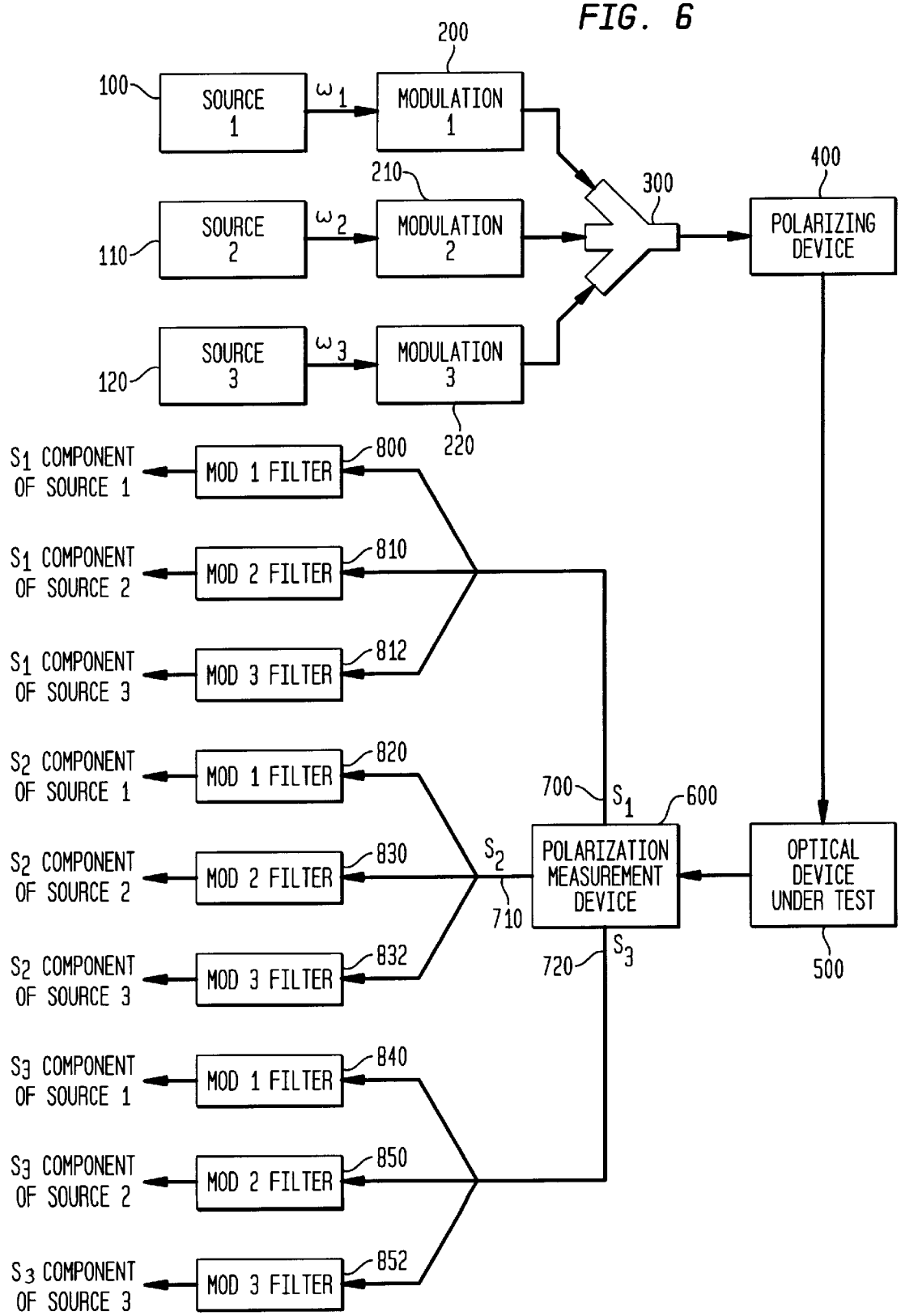
FIG. 6 shows a block diagram of the first embodiment modified to take additional measurements for determining second order PMD vectors.

FIG. 6 shows how the first embodiment may be modified to take enough measurements to determine a second order PMD vector in two steps by adding a third light source operating at frequency $\omega_3$, an additional input to the second stage combining device, a third modulation device, and three filters corresponding to the modulation employed in the third modulation device.

Figure 7:
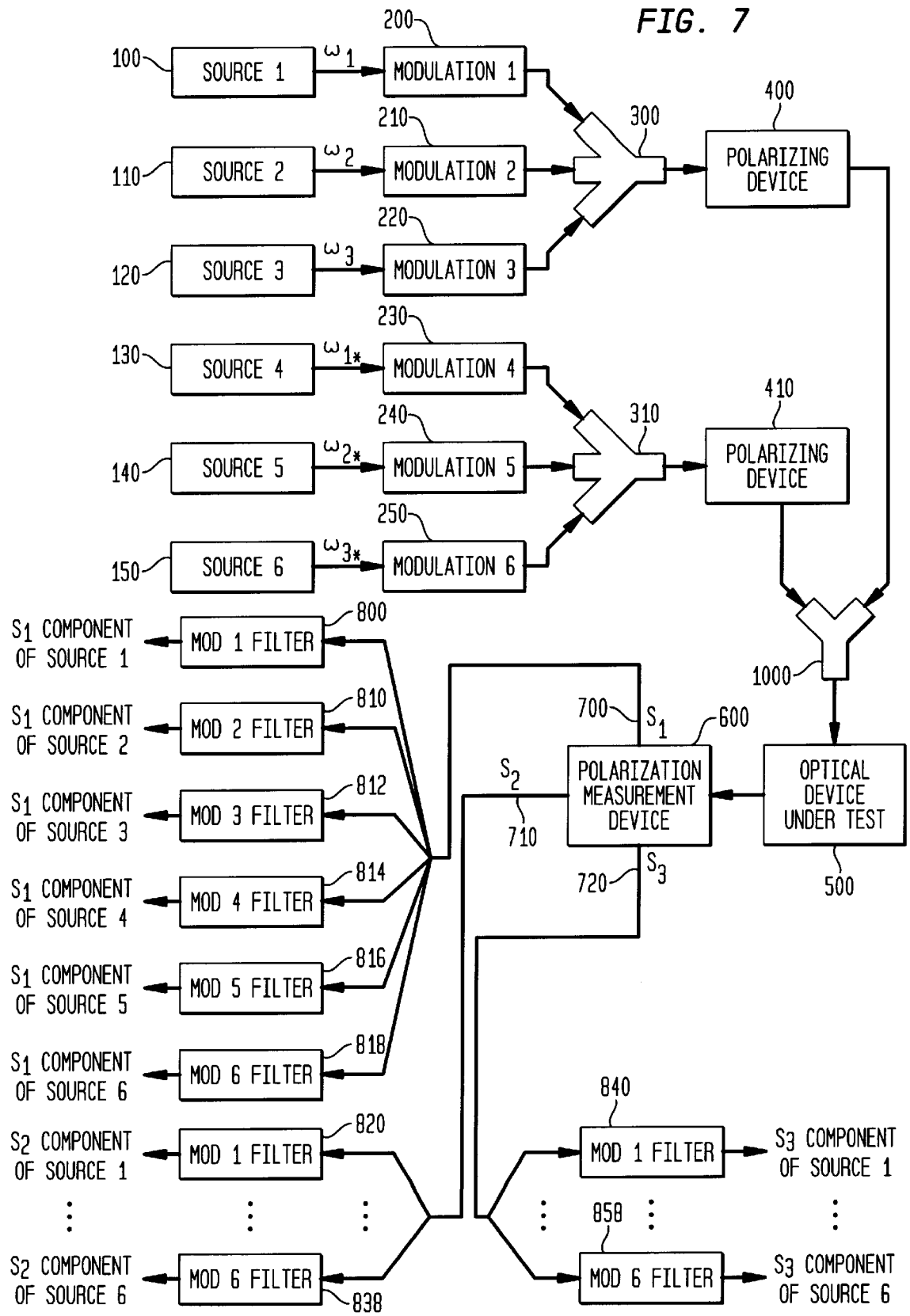
FIG. 7 shows a block diagram of the third embodiment modified to take additional measurements for deter second order PMD vectors.

The third embodiment can be similarly modified, as shown in FIG. 7, by adding two light sources operating at frequency $\omega_3$, an additional input to each second stage combining device, fifth and sixth modulation devices, and six modulation filters with three corresponding to the modulation employed in the fifth modulation device and three corresponding to the modulation employed in the sixth modulation device. Similar to FIG. 4, sources 130, 140, and 150 emit light beams having substantially the same frequencies as the beams emitted from sources 100, 110, and 120. Specifically, sources 130, 140, and 150 emit light beams having frequencies of $\omega_1^*$, $\omega_2^*$, and $\omega_3^*$, respectively where $\omega_1^*=\omega_1+\Delta\omega$, $\omega_2^*=\omega_2+\Delta\omega$, and $\omega_3^*=\omega_3+\Delta\omega$, and $\Delta\omega$ is chosen as previously described in connection with FIG. 3.

It should be further noted that enough data may be simultaneously obtained to determine even higher order PMD by adding as many sources, modulation devices, and modulation filters as necessary. To determine (n−1) order PMD, the first embodiment must have n sources, n modulation devices, and 3n modulation filters and the third embodiment must have 2n sources, 2n modulation devices, and 6n modulation filters.

Where the various embodiments of the invention require the generation of at least two light beams having distinct frequencies, these embodiments may be further improved to increase their ability to take accurate measurements. Since PMD is determined based on measurements taken over frequency intervals, the accuracy of the generation and measurement of these frequency intervals affects the accuracy of the final PMD determinations. Using currently available commercial instrumentation to generate and measure optical frequencies, such as external cavity lasers and wavemeters, can result in an uncertainty of 5% or more in the determination of first order PMD and 10% or more in the measurement of second order PMD.

Figure 8:
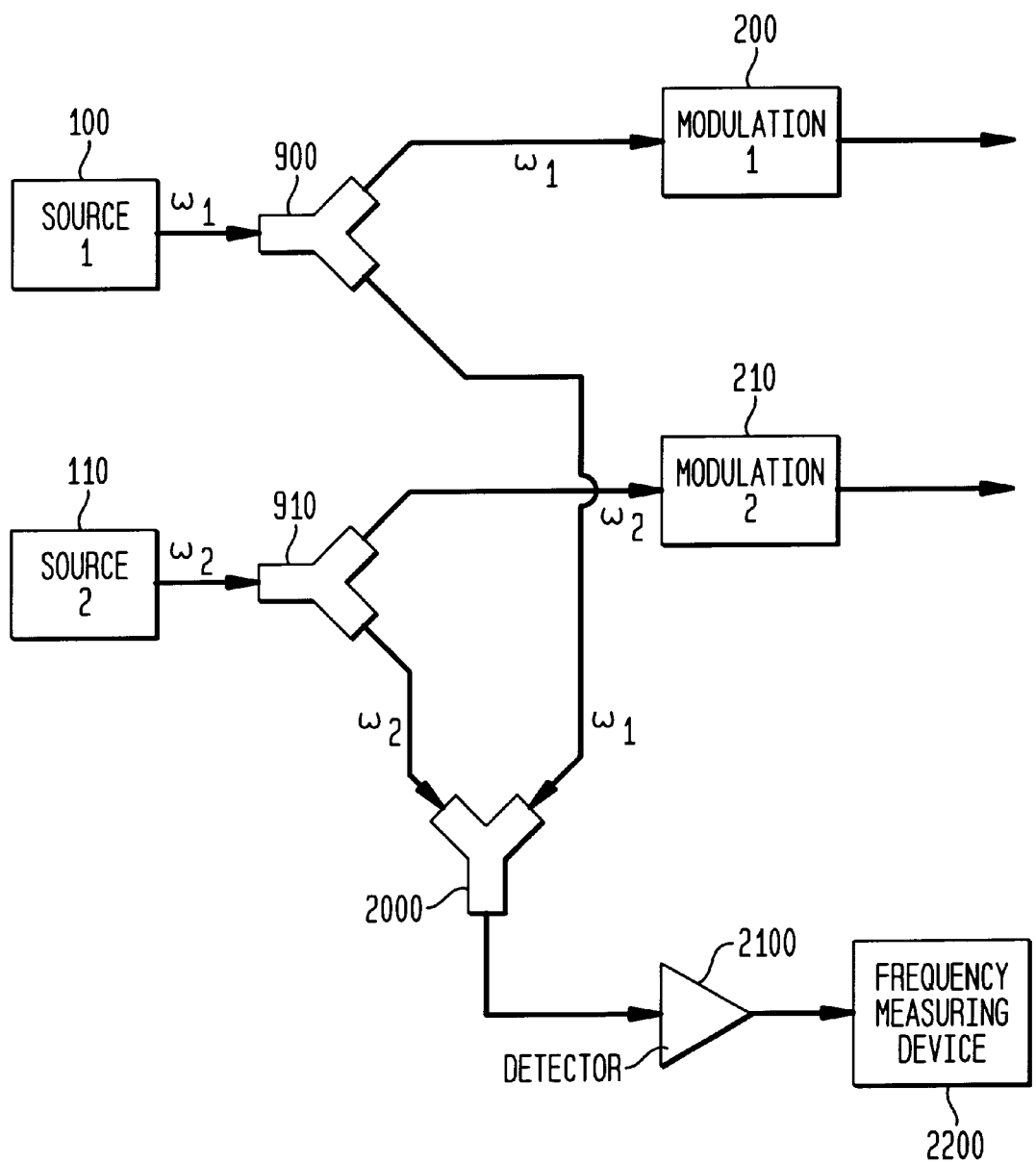
FIG. 8 shows a block diagram of the first embodiment modified to improve measurement of the frequency difference between light sources.

FIG. 8 shows a block diagram of the embodiment of FIG. 2 with added devices which improve the measurement of the frequency difference between two light beams. FIG. 8 shows the light beams emitted from sources 100 and 110 being split off by splitting devices 900 and 910, which as previously described may be implemented as fused fiber couplers, and combined in first stage combining device 2000, which also may be a fused fiber coupler. This combined beam is then input into a detector 2100, which may be an Indium Phosphide detector, which then outputs an AC electrical signal having a frequency equal to the frequency difference between the two light beams. The frequency difference between the two light beams can then be accurately determined using a frequency measuring device 2200 which measures the frequency of the AC electrical signal coming out of detector 2100. The frequency measuring device 2200 may be implemented using a spectrum analyzer or a low pass filter in conjunction with a frequency counter.

It should be apparent to one of skill in the art that the strength of the signal output from detector 2100 is at a minimum where the polarizations of the beams input to combining device 2000 are orthogonal and at a maximum where these polarizations are identical. Consequently, a polarization controller may be used in conjunction with one of the sources to adjust the polarization of one of the beams to maximize the signal output from detector 2100.

Figure 9:
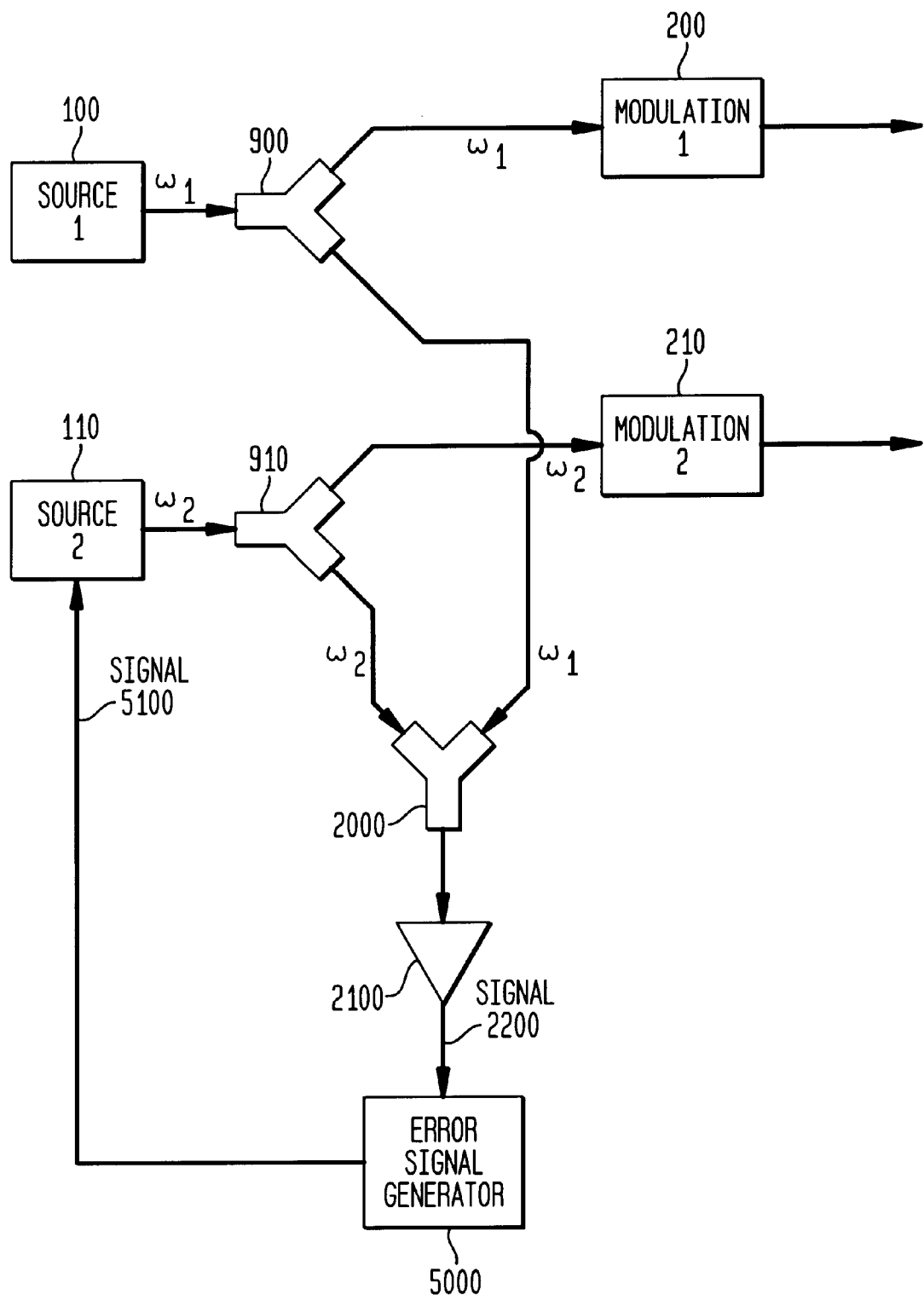
FIG. 9 shows a block diagram of the first embodiment modified to improve control over the frequency difference between light sources.

FIG. 9 shows a block diagram of the embodiment of FIG. 2 with added devices which allow for more accurate control of the frequency difference between the light beams. The light beams emitted from sources 100 and 110 are split off using splitting devices 900 and 910, which may be fused fiber couplers, combined using a first stage combining device 2000, which may again be a fused fiber coupler, and input into a detector 2100 which outputs an AC electrical signal 2200 having a frequency equal to the frequency difference between the two combined light beams. Signal 2200 is then input to an error signal generator 5000 that outputs a signal 5100 that describes the actual frequency difference between the sources, represented by the frequency of signal 2200, and the desired frequency difference between the sources. Error signal generator 5000 may be implemented as a frequency discriminator set at the desired frequency difference. Error signal 5100 is then fed back to source 110 and used to adjust the frequency of that source to reduce the error between the actual frequency difference and the desired frequency difference.

FIG. 9a shows an alternative technique for accurately controlling the frequency difference between two light beams. The apparatus shown in FIG. 9a is similar to that of FIG. 9. However, here the frequency difference signal 2200 serves as one of the input signals to a mixer 2300. The other input signal to the mixer, signal 2500, is generated by a local oscillator 2400 which oscillates at a frequency that is equal to the frequency difference desired between sources 100 and 110. The mixer then outputs another AC signal 2600 which has a frequency equal to the frequency difference between signal 2200 and signal 2500. The frequency of signal 2600 describes the error between the actual frequency difference of the two sources and the desired frequency difference. Signal 2600 is passed through a low pass filter 2700, which may be an RC circuit, to eliminate unnecessary high frequency components. Signal 2800 which emerges from the low pass filter 2700 is then fed back into source 110. This feedback loop allows the frequency of source 110 to be adjusted so that the error between the actual frequency difference and the desired frequency difference eventually becomes zero.

Figure 10:
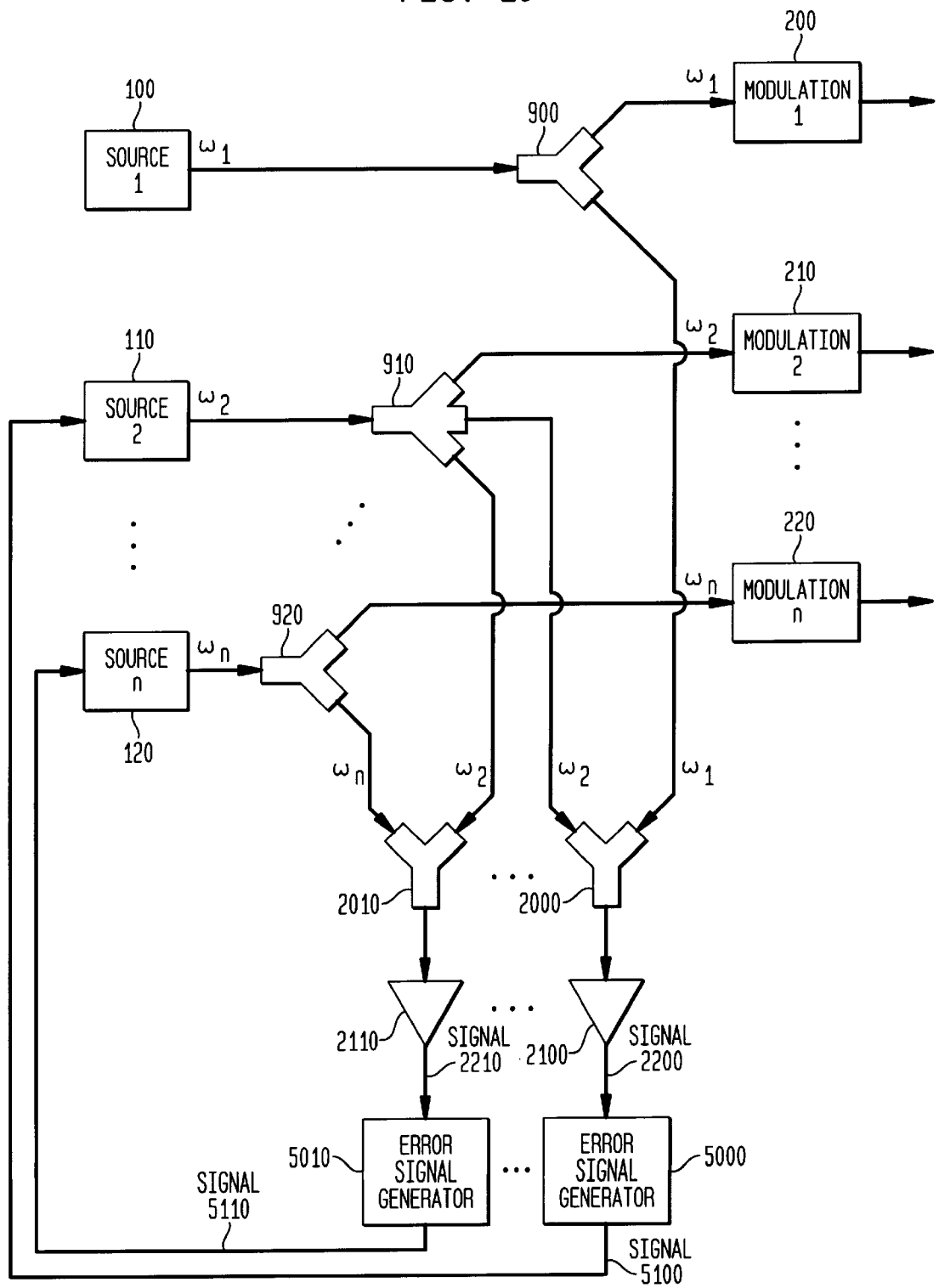
FIG. 10 shows a block diagram of the first embodiment modified to improve control over the frequency difference between light sources where more than two light sources are used.

FIG. 10 shows how the feedback loop improvement of FIG. 9 may be implemented with more than two sources, for instance with the embodiment of FIG. 6 which uses three light sources to directly measure second order PMD. The apparatus of FIG. 10 uses similar components to those used in FIG. 9 but is generalized to a situation having n sources, by using n splitter devices, n–1 combining devices, n–1 detector devices, and n–1 error signal generators.

The first splitter 900 and the nth splitter, here 920, each split their inputted light beams into two light beams. Each splitter between the first and nth splitter, here 910, splits its inputted light beam into three light beams.

Each combining device, 2000, 2010, etc., combines two beams from two successive sources. In other words, the first combiner 2000 combines beams from the first source and the second source. The second combiner 2010 combines beams from the second and third sources. The (n–1)th combiner combines beams from the (n–1)th and nth sources.

The combined beams from the n–1 combiners are then input to n–1 detectors 2100, 2110, etc. Each detector outputs a difference signal 2200, 2210, etc., having a frequency equal to the frequency difference of the combined beam input to the detector.

The n–1 difference signals are input to n–1 error signal generators 5000, 5010, etc., which generate n–1 error signals 5100, 5110, etc. Specifically, the (n–1)th error signal generator outputs an error signal to control the nth source.

Figure 10A:
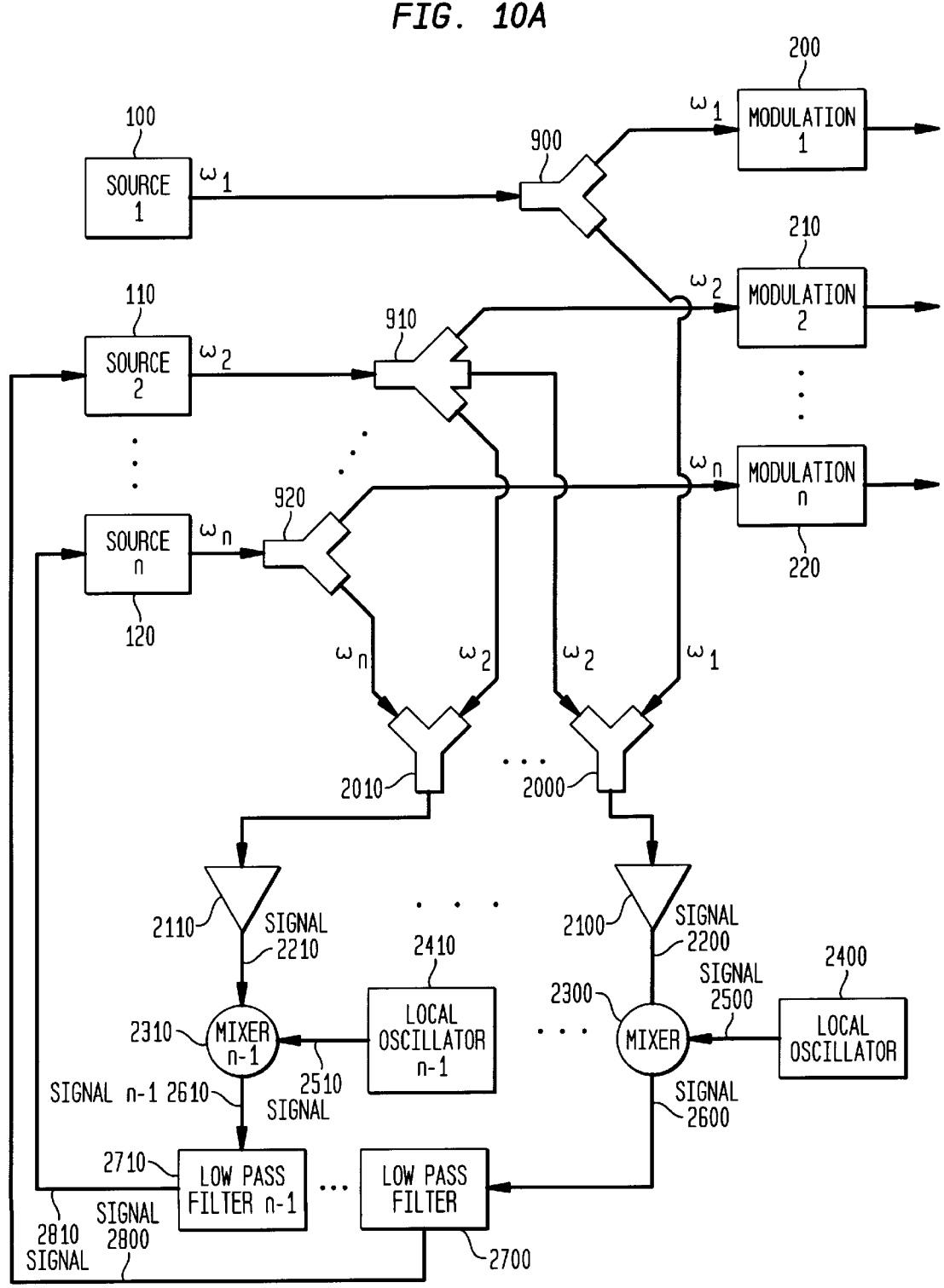
FIG. 10a shows a block diagram of an alternative modification to the first embodiment which improves control over the frequency difference between light sources where more than two light sources are used.

FIG. 10a shows the apparatus of FIG. 9a generalized to n sources. The apparatus of FIG. 10a is similar to the apparatus shown in FIG. 10 except that instead of n–1 error signal generators, FIG. 10a shows n–1 mixers, n–1 local oscillators, and n–1 low-pass filters.

The apparatus of FIG. 10a operates similarly to the apparatus of FIG. 10. However, here the n–1 difference signals are input to n–1 mixers 2300, 2310, etc. Each mixer also receives a signal 2500, 2510, etc., from a local oscillator 2400, 2410, etc. Each local oscillator generates a signal having a frequency equal to the desired frequency difference between its two corresponding sources. Thus, the first local oscillator 2400 generates a signal 2500 having a frequency equal to the desired frequency difference between the first source 100 and the second source 110. The second local oscillator 2410 generates a signal 2510 having a frequency equal to the desired frequency difference between the second source 110 and the third source 120. The (n–1)th local oscillator generates a signal having a frequency equal to the desired frequency difference between the (n–1)th source and the nth source.

It should be apparent to one of skill in the art that a single local oscillator may be used where the desired frequency difference between the several sources is the same. For example, if the desired frequency difference between sources 100 and 110 is the same as the desired frequency difference between sources 110 and 120, then a single local oscillator may be used to provide the input to both mixers.

Each mixer then generates an error signal 2600, 2610, etc., which describes the difference between the desired frequency difference and actual frequency difference. Specifically, the (n–1)th mixer generates an error signal which describes the difference between the desired frequency difference and the actual frequency difference between the (n–1)th source and the nth source.

Each error signal is then passed through a low pass filter 2700, 2710, etc., which removes unwanted high frequency components. The low-pass filtered error signals 2800, 2810, etc., are then fed back to the sources. Specifically, the the low-pass filtered signal corresponding to the (n–1)th low-pass filter and the (n–1)th mixer is then fed back to the nth source to control that source's frequency.

Figure 11:
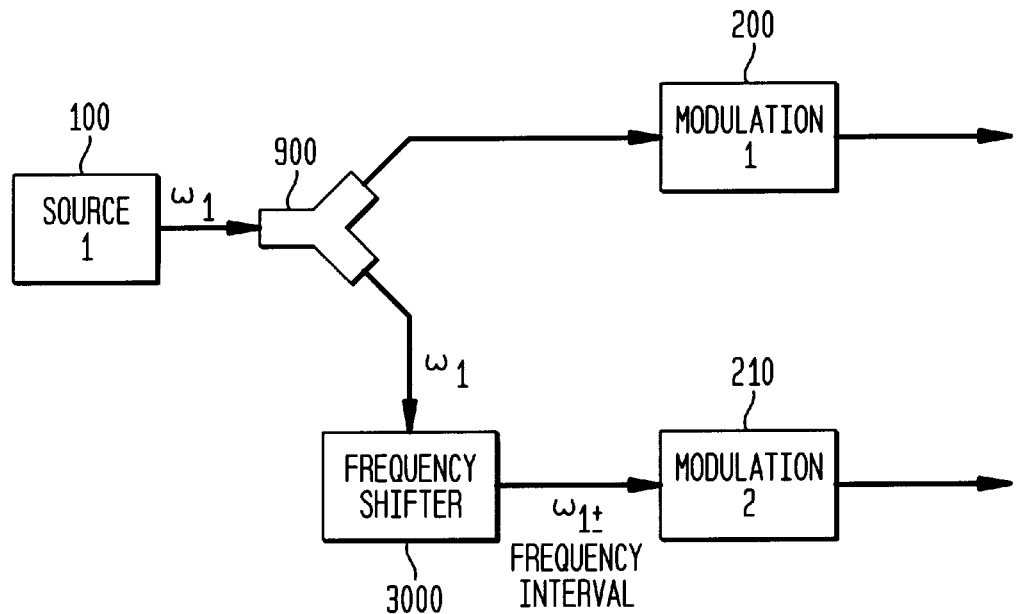
FIG. 11 shows a block diagram of the invention modified to include a frequency shifting device to improve control over the frequency difference of two light beams.

FIG. 11 shows a block diagram of an apparatus employing a different technique for accurately controlling a frequency difference. Instead of using two light sources operating at two difference frequencies, one light source is used in connection with a frequency shifting device which adds or subtracts a set frequency interval to an input light beam. In FIG. 11, source 100 emits a light beam having a frequency $\omega_1$ which is split by a splitting device 900, as implemented in previous embodiments, and fed into frequency shifting device 3000. Frequency shifting device 3000 then outputs a light beam having the frequency of the original light beam, $\omega_1$, plus or minus a set frequency interval. The frequency shifting device shown in FIG. 11 may be implemented by any device which receives a light beam having a frequency $\omega_1$ and outputs a light beam having a frequency $\omega_1$ plus or minus a set frequency interval. For instance, the frequency shifting device of FIG. 11 may be implemented as a bulk-optic acousto-optic modulator.

Figure 12:
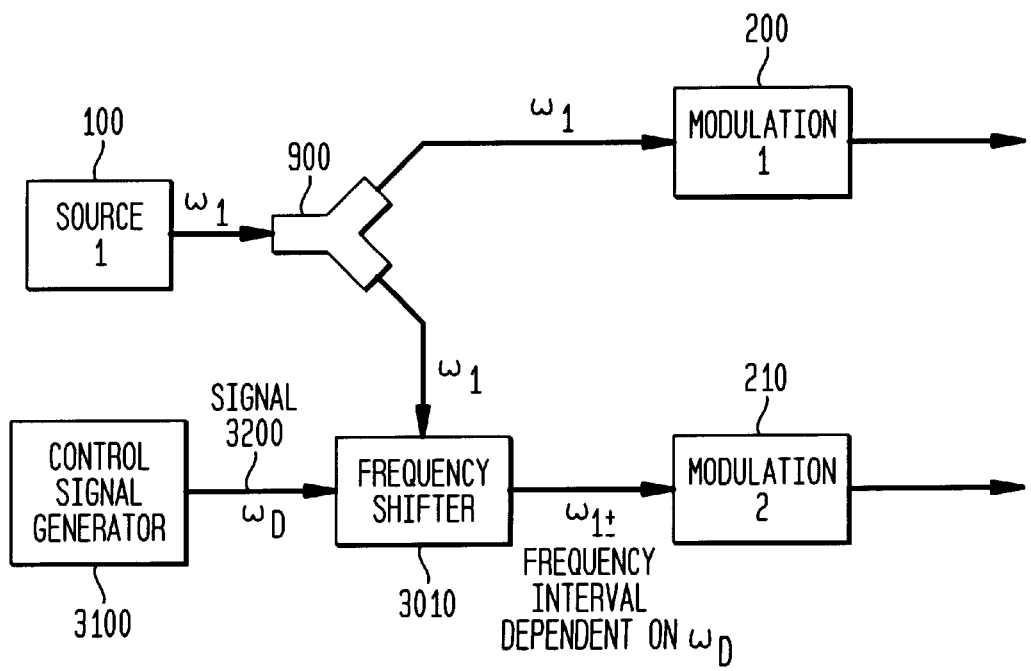
FIG. 12 shows a block diagram of the invention modified to include another frequency shifting device to improve control over the frequency difference of two light beams.

Alternatively, this frequency shifting technique may be implemented as shown in FIG. 12. The apparatus of FIG. 12 is similar to that of FIG. 11 except that a different type of frequency shifting device is used. Frequency shifting device 3010 receives a light beam having a frequency on, as one input. Another input to frequency shifting device 3010 is signal 3200 having a frequency $\omega_D$ generated by control signal generator 3100. Frequency shifting device 3010 then outputs a signal having the frequency of the input light beam $\omega_1$ plus or minus a frequency interval dependent on $\omega_D$.

Signal 3200 may be an optical or electrical signal and control signal generator 3100 may be implemented by any device capable of generating a signal having a specific frequency, where the signal is either optical or electrical depending on the needs of frequency shifting device 3010. Frequency shifting device 3010 may be implemented by any device that receives a light beam having a frequency $\omega_1$ and a control signal having a frequency $\omega_D$ and outputs a light beam having a frequency $\omega_1$ plus or minus a frequency interval dependent on $\omega_D$.

For instance, frequency shifting device 3010 may be implemented as a bulk, planar or waveguide acousto-optic device, a bulk, planar or waveguide magneto-optic device, an electro-optic single sideband modulator, an electro-optic amplitude modulator, an electro-optic phase modulator, or some combination of these. In these implementations, control signal generator 3200 generates an electrical control signal 3200 having a frequency $\omega_D$ and the light beam output from these frequency shifting devices is $\omega_1+n\omega_D$, where n is a positive or negative integer.

Also, frequency shifting device 3010 may be implemented as an optical device such as a four-wave mixing device, the construction of which is known by those skilled in the art. In this case, control signal generator 3200 generates an optical control signal 3200 having a frequency $\omega_D$ and the light beam output from the four-wave mixing device can be chosen to be either $2\omega_1-\omega_D$ or $2\omega_D-\omega_1$.

The foregoing merely illustrates the principles of the present invention. Those skilled in the art will be able to devise various modifications, which although not explicitly described or shown herein, embody the principles of the invention and are thus within its spirit and scope.

What is claimed is:

1. A system for measuring the PMD of an optical device under test comprising an input section and a measuring section, said input section comprising:
    at least one modulating device, each of said modulating devices receiving one light beam and outputting at least one light beam such that each of said light beams output from each of said modulating devices is given a unique modulation;
    at least one polarizing device for polarizing at least one light beam after said light beam has been modulated by the modulating device, wherein no two light beams of the same frequency are given the same polarization; and
said measuring section comprising:
    at least one polarization measurement device for receiving at least one of said polarized, modulated light beams having passed through said optical device under test, wherein no two light beams of the same frequency are received by one polarization measurement device, each of said polarization measurement devices outputting at least one composite electrical signal which is dependent on the polarization states of said polarized, modulated light beams having passed through said optical device under test and having been received by said polarization measurement device; and
    at least one filter corresponding to each of said light beams output from each of said modulating devices, each of said filters selecting an electrical signal from one of said composite electrical signals using the modulation of its corresponding light beam.

2. The system of claim 1, wherein said input section further comprises at least one light source for producing said light beams to be input to said modulating devices and said polarizing devices.

3. The system of claim 1, wherein said input section further comprises at least one second stage combining device, each of said second stage combining devices combining at least two modulated light beams prior to said modulated beams being input to said polarizing devices.

4. The system of claim 1, wherein said input section further comprises at least one third stage combining device, each of said third stage combining devices combining at least two polarized, modulated light beams.

5. The system of claim 1, wherein said input section further comprises at least one splitting device, each of said splitting devices splitting a light beam into at least two light beams prior to said split light beams being input to said modulating devices and said polarizing devices.

6. The system of claim 5, wherein said input section further comprises:
    at least one frequency shifting device wherein all of said frequency shifting devices receives all of said light beams to be given a particular polarization and shifts the frequencies of all of said light beams to be given said polarization such that the frequency of each of said light beams to be given one polarization is increased or decreased by a frequency interval; and
    at least one third stage combining device, each of said third stage combining devices combining at least one said polarized, modulated light beam with at least one frequency shifted, polarized, modulated light beam.

7. The system of claim 5, wherein said input section further comprises:
    at least one first stage combining device, each of said first stage combining devices combining at least two split light beams having distinct frequencies prior to said split light beams being input to said modulating devices and said polarizing devices, and outputting a combined light beam;
    one detector device corresponding to each of said combined light beams, each of said detector devices generating a difference signal having a frequency equal to the frequency difference between said distinct frequencies in its corresponding combined light beam; and one frequency measuring device corresponding to each of said detector devices, each of said frequency measuring devices measuring the frequency of said difference signal.

8. The system of claim 5, wherein said input section further comprises:

at least two light sources for producing said light beams;

at least one first stage combining device, each of said first stage combining devices combining at least two split light beams having distinct frequencies prior to said split light beams being input to said modulating devices and said polarizing devices, and outputting a combined light beam;

one detector device corresponding to each of said combined light beams, each of said detector devices generating a difference signal having a frequency equal to the frequency difference between said distinct frequencies in its corresponding combined light beam; and one error signal generating device corresponding to each of said detector devices, each of said error signal generating devices generating an error signal dependent on said difference signal of its corresponding detector device, said error signal being input to at least one of said light sources.

9. The system of claim 5, wherein said input section further comprises:

at least two light sources for producing said light beams;

at least one first stage combining device, each of said first stage combining devices combining at least two split light beams having distinct frequencies prior to said split light beams being input to said modulating devices and said polarizing devices, and outputting a combined light beam;

one detector device corresponding to each of said combined light beams, each of said detector devices generating a difference signal having a frequency equal to the frequency difference between said distinct frequencies in its corresponding combined light beam;

one control signal generating device corresponding to each of said detector devices, each of said control signal generating devices generating a control signal having a desired frequency;

one mixing device corresponding to each of said detector devices and each of said control signal generating devices, each of said mixing devices generating an error signal having a frequency equal to the difference in frequencies between said control signal of its corresponding control signal generating device and said difference signal of its corresponding detector device; and one filtering device corresponding to each of said mixing devices, each of said filtering devices removing unwanted components from said error signal of said corresponding mixing devices prior to said error signal being input to at least one of said light sources.

10. The system of claim 5, wherein said input section further comprises:

at least one frequency shifting device, each of said frequency shifting devices receiving one of said split light beams prior to said split light beam being input to said modulating devices and said polarizing devices and shifting the frequency of said received, split light beam such that the frequency of said received, split light beam is increased or decreased by a frequency interval, said frequency shifted light beam being input to at least one of said modulation devices and at least one of said polarizing devices.

11. The system of claim 10, wherein said frequency shifting devices are bulk-optic acousto-optic modulators.

12. The system of claim 5, wherein said input section further comprises:

at least one control signal generating device, each of said control signal generating devices generating a control signal having a frequency $\omega_D$; and one frequency shifting device corresponding to each of said control signal generating devices, each of said frequency shifting devices receiving one of said split light beams prior to said split light beam being input to said modulating devices and said polarizing devices and shifting the frequency of said received, split light beam such that the frequency of said received, split light beam is increased or decreased by a frequency interval dependent on said frequency $\omega_D$ of its corresponding control signal, said frequency shifted light beam being input to at least one of said modulation devices and at least one of said polarizing devices.

13. The system of claim 12, wherein said frequency shifting device is a bulk acousto-optic Bragg cell.

14. The system of claim 12, wherein said frequency shifting device is an acousto-optic waveguide.

15. The system of claim 12, wherein said frequency shifting device is a bulk magneto-optic cell.

16. The system of claim 12, wherein said frequency shifting device is a planar magneto-optic device.

17. The system of claim 12, wherein said frequency shifting device is a single-sideband modulator.

18. The system of claim 12, wherein said frequency shifting device is a four-wave mixing device.

19. A method for measuring the PMD of an optical device under test having input and output interfaces, comprising the steps of:

modulating at least one light beam such that each of said light beams is given a distinct modulation;

polarizing said light beams such that no two light beams of the same frequency are given the same polarization after said light beams have been modulated by the modulating device;

inputting at least one of said polarized, modulated light beams to said optical device under test such that said light beams propagate through said optical device under test;

producing at least one composite electrical signal such that each of said composite electrical signals is dependent on the polarization states of at least one of said polarized, modulated light beams having propagated through said optical device under test; and selecting at least one electrical signal from each of said composite electrical signals based on the modulation of each of said modulated light beams.

20. The method of claim 19, further comprising the step of combining at least two modulated light beams prior to said light beams being polarized.

21. The method of claim 19, further comprising the step of combining at least two polarized, modulated light beams.

22. The method of claim 19, further comprising the step of splitting at least one light beam into at least two light beams prior to said light beams being modulated and polarized.

23. The method of claim 22, further comprising the steps of:

shifting the frequency of each said light beams to be given one of said polarizations such that the frequency of each of said light beams to be given one of said polarizations is increased or decreased by a frequency interval; and combining at least one polarized, modulated light beam with at least one frequency shifted, polarized, modulated light beam.

24. The method of claim 22, further comprising the steps of:

creating at least one combined light beam by combining at least two split light beams having distinct frequencies prior to said split light beams being modulated and polarized;

generating one difference signal corresponding to each of said combined light beams, each of said difference signals having a frequency equal to the difference in frequencies between said distinct frequencies in its corresponding combined light beam; and measuring the frequency of each of said difference signals.

25. The method of claim 22, further comprising the steps of:

creating at least one combined light beam by combining at least two split light beams having distinct frequencies prior to said split light beams being modulated and polarized;

generating one difference signal corresponding to each of said combined light beams, each of said difference signals having a frequency equal to the difference in frequencies between said distinct frequencies in its corresponding combined light beam;

generating one error signal corresponding to each of said difference signals, each of said error signals dependent on its corresponding difference signal; and using each of said error signals to control the frequency of at least one of said light beams prior to said light beam being split.

26. The method of claim 22, further comprising the steps of:

creating at least one combined light beam by combining at least two split light beams having distinct frequencies prior to said split light beams being modulated and polarized;

generating one difference signal corresponding to each of said combined light beams, each of said difference signals having a frequency equal to the difference in frequencies between said distinct frequencies in its corresponding combined light beam;

generating one control signal corresponding to each of said difference signals, each of said control signals having a desired frequency; and generating one error signal corresponding to each of said difference signals and each of said control signals, each of said error signals having a frequency equal to the difference in frequencies between its corresponding control signal and its corresponding difference signal.

27. The method of claim 22, further comprising the steps of:

shifting the frequency of one of said split light beams prior to said split light beam being modulated or polarized such that the frequency of said split light beam to be frequency shifted is increased and decreased by a frequency interval.

28. The method of claim 22, further comprising the steps of:

generating a control electrical signal having a frequency $\omega_D$; and shifting the frequency of one of said split light beams prior to said split light beam being modulated or polarized such that the frequency of said split light beam to be frequency shifted is increased and decreased by a frequency interval dependent on said frequency $\omega_D$ of said control signal.

29. A system for measuring the PMD of an optical device under test comprising an input section and a measuring section, said input section comprising:

at least one polarizing device for polarizing at least one light beam, wherein no two light beams of the same frequency are given the same polarization;

at least one modulating device, each of said modulating devices receiving one light beam and outputting at least one light beam, after said light beam has been polarized by the polarizing device, such that each of said light beams output from each of said modulating devices is given a unique modulation; and said measuring section comprising:

at least one polarization measurement device for receiving at least one of said polarized, modulated light beams having passed through said optical device under test, wherein no two light beams of the same frequency are received by one polarization measurement device, each of said polarization measurement devices outputting at least one composite electrical signal which is dependent on the polarization states of said polarized, modulated light beams having passed through said optical device under test and having been received by said polarization measurement device; and at least one filter corresponding to each of said light beams output from each of said modulating devices, each of said filters selecting an electrical signal from one of said composite electrical signals using the modulation of its corresponding light beam.

30. The system of claim 29, wherein said input section further comprises at least one light source for producing said light beams to be input to said polarizing devices and said modulating devices.

31. The system of claim 29, wherein said input section further comprises at least one third stage combining device, each of said third stage combining devices combining at least two polarized, modulated light beams.

32. The system of claim 29, wherein said input section further comprises at least one splitting device, each of said splitting devices splitting a light beam into at least two light beams prior to said split light beams being input to said polarizing devices and said modulating devices.

33. The system of claim 32, wherein said input section further comprises:

at least one frequency shifting device wherein all of said frequency shifting devices receives all of said light beams to be given a particular polarization and shifts the frequencies of all of said light beams to be given said polarization such that the frequency of each of said light beams to be given said polarization is increased or decreased by a frequency interval; and at least one third stage combining device, each of said third stage combining devices combining at least one said polarized, modulated light beam with at least one frequency shifted, polarized, modulated light beam.

34. The system of claim 32, wherein said input section further comprises:

at least one first stage combining device, each of said first stage combining devices combining at least two split light beams having distinct frequencies prior to said split light beams being input to said polarizing devices and said modulating devices, and outputting a combined light beam;

one detector device corresponding to each of said combined light beams, each of said detector devices generating a difference signal having a frequency equal to the frequency difference between said distinct frequencies in its corresponding combined light beam; and one frequency measuring device corresponding to each of said detector devices, each of said frequency measuring devices measuring the frequency of said difference signal.

35. The system of claim 32, wherein said input section further comprises:

at least two light sources for producing said light beams;

at least one first stage combining device, each of said first stage combining devices combining at least two split light beams having distinct frequencies prior to said split light beams being input to said polarizing devices and said modulating devices, and outputting a combined light beam;

one detector device corresponding to each of said combined light beams, each of said detector devices generating a difference signal having a frequency equal to the frequency difference between said distinct frequencies in its corresponding combined light beam; and one error signal generating device corresponding to each of said detector devices, each of said error signal generating devices generating an error signal dependent on said difference signal of its corresponding detector device, said error signal being input to at least one of said light sources.

36. The system of claim 32, wherein said input section further comprises:

at least two light sources for producing said light beams;

at least one first stage combining device, each of said first stage combining devices combining at least two split light beams having distinct frequencies prior to said split light beams being input to said polarizing devices and said modulating devices, and outputting a combined light beam;

one detector device corresponding to each of said combined light beams, each of said detector devices generating a difference signal having a frequency equal to the frequency difference between said distinct frequencies in its corresponding combined light beam;

one control signal generating device corresponding to each of said detector devices, each of said control signal generating devices generating a control signal having a desired frequency;

one mixing device corresponding to each of said detector devices and each of said control signal generating devices, each of said mixing devices generating an error signal having a frequency equal to the difference in frequencies between said control signal of its corresponding control signal generating device and said difference signal of its corresponding detector device; and one filtering device corresponding to each of said mixing devices, each of said filtering devices removing unwanted components from said error signal of said corresponding mixing devices prior to said error signal being input to at least one of said light sources.

37. The system of claim 32, wherein said input section further comprises:

at least one frequency shifting device, each of said frequency shifting devices receiving one of said split light beams prior to said split light beam being input to said polarizing devices and said modulating devices and shifting the frequency of said received, split light beam such that the frequency of said received, split light beam is increased or decreased by a frequency interval, said frequency shifted light beam being input to at least one of said polarizing devices and at least one of said modulation devices.

38. The system of claim 37, wherein said frequency shifting devices are bulk-optic acousto-optic modulators.

39. The system of claim 32, wherein said input section further comprises:

at least one control signal generating device, each of said control signal generating devices generating a control signal having a frequency $\omega_D$; and one frequency shifting device corresponding to each of said control signal generating devices, each of said frequency shifting devices receiving one of said split light beams prior to said split light beam being input to said polarizing devices and said modulating devices and shifting the frequency of said received, split light beam such that the frequency of said received, split light beam is increased or decreased by a frequency interval dependent on said frequency $\omega_D$ of its corresponding control signal, said frequency shifted light beam being input to at least one of said polarizing devices and at least one of said modulation devices.

40. The system of claim 39, wherein said frequency shifting device is a bulk acousto-optic Bragg cell.

41. The system of claim 39, wherein said frequency shifting device is an acousto-optic waveguide.

42. The system of claim 39, wherein said frequency shifting device is a bulk magneto-optic cell.

43. The system of claim 39, wherein said frequency shifting device is a planar magneto-optic device.

44. The system of claim 39, wherein said frequency shifting device is a single-sideband modulator.

45. The system of claim 39, wherein said frequency shifting device is a four-wave mixing device.

46. A method for measuring the PMD of an optical device under test having input and output interfaces, comprising the steps of:

polarizing light beams such that no two light beams of the same frequency are given the same polarization;

modulating at least one light beam such that each of said light beams is given a distinct modulation after said light beam has been polarized by the polarizing device,;

inputting at least one of said polarized, modulated light beams to said optical device under test such that said light beams propagate through said optical device under test;

producing at least one composite electrical signal such that each of said composite electrical signals is dependent on the polarization states of at least one of said polarized, modulated light beams having propagated through said optical device under test; and selecting at least one electrical signal from each of said composite electrical signals based on the modulation of each of said modulated light beams.

47. The method of claim 46, further comprising the step of combining at least two polarized, modulated light beams.

48. The method of claim 46, further comprising the step of splitting at least one light beam into at least two light beams prior to said light beams being polarized and modulated.

49. The method of claim 48, further comprising the steps of:

shifting the frequency of each said light beams to be given one of said polarizations such that the frequency of each of said light beams to be given one of said polarizations is increased or decreased by a frequency interval; and combining at least one polarized, modulated light beam with at least one frequency shifted, polarized, modulated light beam.

50. The method of claim 48, further comprising the steps of:

creating at least one combined light beam by combining at least two split light beams having distinct frequencies prior to said split light beams being polarized and modulated;

generating one difference signal corresponding to each of said combined light beams, each of said difference signals having a frequency equal to the difference in frequencies between said distinct frequencies in its corresponding combined light beam; and measuring the frequency of each of said difference signals.

51. The method of claim 48, further comprising the steps of:

creating at least one combined light beam by combining at least two split light beams having distinct frequencies prior to said split light beams being polarized and modulated;

generating one difference signal corresponding to each of said combined light beams, each of said difference signals having a frequency equal to the difference in frequencies between said distinct frequencies in its corresponding combined light beam;

generating one error signal corresponding to each of said difference signals, each of said error signals dependent on its corresponding difference signal; and using each of said error signals to control the frequency of at least one of said light beams prior to said light beam being split.

52. The method of claim 48, further comprising the steps of:

creating at least one combined light beam by combining at least two split light beams having distinct frequencies prior to said split light beams being polarized and modulated;

generating one difference signal corresponding to each of said combined light beams, each of said difference signals having a frequency equal to the difference in frequencies between said distinct frequencies in its corresponding combined light beam;

generating one control signal corresponding to each of said difference signals, each of said control signals having a desired frequency; and generating one error signal corresponding to each of said difference signals and each of said control signals, each of said error signals having a frequency equal to the difference in frequencies between its corresponding control signal and its corresponding difference signal.

53. The method of claim 48, further comprising the steps of:

shifting the frequency of one of said split light beams prior to said split light beam being polarized and modulated such that the frequency of said split light beam to be frequency shifted is increased or decreased by a frequency interval.

54. The method of claim 48, further comprising the steps of:

generating a control electrical signal having a frequency $\omega_D$; and shifting the frequency of one of said split light beams prior to said split light beam being polarized and modulated such that the frequency of said split light beam to be frequency shifted is increased or decreased by a frequency interval dependent on said frequency $\omega_D$ of said control signal.

* * * * *